United States Patent
Baker

(10) Patent No.: US 8,931,235 B2
(45) Date of Patent: Jan. 13, 2015

(54) METHOD FOR ERECTING A FACILITY PRODUCING ELECTRICAL ENERGY FROM WIND

(71) Applicant: Brookes H. Baker, Fort Worth, TX (US)

(72) Inventor: Brookes H. Baker, Fort Worth, TX (US)

( * ) Notice: Subject to any disclaimer, the term of this patent is extended or adjusted under 35 U.S.C. 154(b) by 0 days.

(21) Appl. No.: 13/674,912

(22) Filed: Nov. 12, 2012

(65) Prior Publication Data

US 2013/0067853 A1  Mar. 21, 2013

Related U.S. Application Data

(63) Continuation-in-part of application No. 13/189,454, filed on Jul. 22, 2011, now abandoned, which is a continuation-in-part of application No. 13/161,471, filed on Jun. 15, 2011, now Pat. No. 8,653,684.

(60) Provisional application No. 61/397,665, filed on Jun. 15, 2010.

(51) Int. Cl.
| | |
|---|---|
| *E02D 27/42* | (2006.01) |
| *E04H 12/10* | (2006.01) |
| *F03D 1/00* | (2006.01) |
| *F03D 1/04* | (2006.01) |

(52) U.S. Cl.
CPC ...... *F03D 1/001* (2013.01); *F03D 1/04* (2013.01); *F05B 2240/40* (2013.01); *Y02E 10/728* (2013.01)
USPC .......................... 52/745.17; 52/299; 52/651.01

(58) Field of Classification Search
USPC ................... 52/745.17, 249, 169.9, 299, 633, 52/651.01, 653.2
See application file for complete search history.

(56) References Cited

U.S. PATENT DOCUMENTS

| | | | |
|---|---|---|---|
| 2,374,889 A | 5/1945 | Ording | |
| 2,751,672 A | 6/1956 | Reed | |
| 4,134,707 A | 1/1979 | Ewers | |
| 4,140,433 A | 2/1979 | Eckel | |
| 4,184,084 A | 1/1980 | Crehore | |
| 4,245,958 A * | 1/1981 | Ewers | 416/197 A |
| 4,260,325 A | 4/1981 | Cymara | |
| 4,274,010 A | 6/1981 | Lawson-Tancred | |
| 4,321,005 A * | 3/1982 | Black | 415/4.2 |
| 4,321,476 A | 3/1982 | Buels | |
| 4,323,331 A | 4/1982 | Schachle | |
| 4,365,929 A | 12/1982 | Retz | |

(Continued)

FOREIGN PATENT DOCUMENTS

| | | |
|---|---|---|
| CN | 101270726 | 9/2008 |
| EP | 1363019 | 11/2003 |

(Continued)

*Primary Examiner* — Brent W Herring
(74) *Attorney, Agent, or Firm* — Eric Karich

(57) ABSTRACT

A method for erecting a facility includes the steps of constructing initial tower panels on a foundation. Work platforms and guys are installed so that additional tower panels may be installed on top of the existing tower panels. The work platforms with guys may then be raised, so that the process may be repeated until tower section height is reached. Tower sections are them completed by the addition of peripheral trusses and permanent guys, and additional tower sections are constructed by repeating the process to reach the desired facility height. Lifting units including truss and rail systems and rotatable modules with turbines in shrouds are assembled on the ground, then raised up the towers and operably mounted for generating electricity from wind. The erection process is sequenced to maintain structural integrity.

11 Claims, 26 Drawing Sheets

(56) References Cited

U.S. PATENT DOCUMENTS

| | | | |
|---|---|---|---|
| 4,498,017 A | 2/1985 | Parkins | |
| 4,585,950 A | 4/1986 | Lund | |
| 4,786,235 A * | 11/1988 | Van der Veken | 416/121 |
| 5,429,480 A | 7/1995 | Van Der Veken | |
| 5,495,128 A | 2/1996 | Brammeier | |
| 5,520,505 A | 5/1996 | Weisbrich | |
| 6,749,399 B2 | 6/2004 | Heronemus | |
| 6,951,443 B1 | 10/2005 | Blakemore | |
| 7,095,129 B2 | 8/2006 | Moroz | |
| 7,183,664 B2 | 2/2007 | McClintic | |
| 7,293,960 B2 | 11/2007 | Yamamoto | |
| 7,528,498 B2 | 5/2009 | Yeh | |
| 7,932,620 B2 | 4/2011 | Plant | |
| 8,120,197 B2 * | 2/2012 | Branco | 290/54 |
| 2001/0050299 A1 | 12/2001 | Coleman et al. | |
| 2005/0019163 A1 | 1/2005 | Heronemus | |
| 2008/0093861 A1 | 4/2008 | Friesth et al. | |
| 2008/0124217 A1 | 5/2008 | Friesth | |
| 2008/0129050 A1 | 6/2008 | Guey et al. | |
| 2008/0296897 A1 | 12/2008 | Kovach et al. | |
| 2009/0008939 A1 | 1/2009 | Pare et al. | |
| 2009/0167026 A1 | 7/2009 | Marvin | |
| 2009/0218823 A1 | 9/2009 | Wu et al. | |
| 2009/0322085 A1 | 12/2009 | Renaud | |
| 2010/0031589 A1 | 2/2010 | Fernald et al. | |
| 2010/0080683 A1 | 4/2010 | Presz et al. | |
| 2010/0090473 A1 | 4/2010 | Glass | |
| 2010/0119370 A1 | 5/2010 | Myhr | |
| 2010/0166547 A1 | 7/2010 | Presz et al. | |
| 2010/0296928 A1 | 11/2010 | Falcone et al. | |
| 2011/0020110 A1 | 1/2011 | Presz et al. | |
| 2011/0076146 A1 | 3/2011 | Falcone et al. | |
| 2011/0204634 A1 * | 8/2011 | Skala | 290/44 |
| 2012/0051939 A1 | 3/2012 | Marvin et al. | |

FOREIGN PATENT DOCUMENTS

| | | |
|---|---|---|
| EP | 2300316 | 3/2011 |
| GB | 2425153 | 10/2006 |
| GB | 2457773 | 9/2009 |
| JP | 2001050149 | 2/2001 |
| JP | 201186740 | 7/2001 |
| WO | WO9800639 | 1/1998 |
| WO | WO2008086608 | 7/2008 |
| WO | WO2009107132 | 9/2009 |
| WO | WO20100042480 | 4/2010 |

* cited by examiner

METHOD FOR ERECTING A FACILITY PRODUCING ELECTRICAL ENERGY FROM WIND

CROSS-REFERENCE TO RELATED APPLICATIONS

This application for a utility patent claims the benefit of U.S. Provisional Application No. 61/397,665, filed Jun. 15, 2010

This application is a continuation-in-part of U.S. Utility application Ser. No. 13/161,471, filed Jun. 15, 2011, and U.S. Utility application Ser. No. 13/189,454, filed Jul. 22, 2011, both still pending.

STATEMENT REGARDING FEDERALLY SPONSORED RESEARCH

Not Applicable

BACKGROUND OF THE INVENTION

1. Field of the Invention

This invention relates generally to power generation devices, and more particularly to a wind power generation facility.

2. Description of Related Art

The prior art teaches the use of a shroud to increase the velocity of a prevailing wind in a throat of the shroud, to increase the ability of a turbine to capture energy from the wind. However, prior art shrouds do not teach a shroud that is shaped to both increase the mass of wind passing through the shroud, and also minimize the drag on the shroud.

Yamamoto, U.S. Pat. No. 7,293,960, for example, teaches a floating wind generating facility that includes hexagonal shaped shrouds. The shape of the shrouds, and in particular the outer surfaces of the shrouds, has a shape that will create considerable drag.

Friesth, U.S. 2008/12417, teaches a shroud that includes a planar face and non-aerodynamically shaped planer outer surface that together create substantial drag.

The facility taught in the present disclosure also includes a tower construction that may be extremely tall. In such a tall structure, it is important to minimize drag to prevent the tower from failing in extreme winds.

The prior art does teach some substantial towers to optimize the capture of energy from the wind over a small square footage of foundation. Friesth teaches a tower construction that includes a core tower and a plurality of guys for providing lateral and torsional stability. Another example of a similar tower construction is shown in Weisbrich, U.S. Pat. No. 5,520,505.

The above-described references are hereby incorporated by reference in full.

SUMMARY OF THE INVENTION

The present invention teaches certain benefits in construction and use which give rise to the objectives described below.

The present invention provides a method for erecting a facility for producing electrical energy from wind. The method includes constructing a foundation to support the facility and constructing at least three towers on the foundation. The construction of the at least three towers includes erecting at least three tower sections on the foundation to start the at least three towers; providing work platforms on the at least three towers; connecting and tensioning guys between each of the at least three towers and at least one of the adjacent towers; lifting, positioning, and installing another of the tower sections on top of the existing at least three towers, climbing all work platforms to tops of the at least three towers; adjusting and/or adding additional guys; installing, at intervals, peripheral trusses between adjacent towers; and repeating steps these steps until a desired height is reached. The constructing and mounting of a plurality of turbine modules on the at least three towers involves assembling and mounting a truss and rail system at a base of the at least three towers; mounting a frame on the truss and rail system via a plurality of trucks; mounting and assembling shroud sectors on the frame to form a pair of shrouds; periodically lifting and re-mounting the frame to a higher truss and rail system when the at least three towers are tall enough to accommodate another pair of shrouds, so that the pair of shrouds are raised a distance from the foundations to provide space for assembly of another pair of shrouds; and repeating these steps until a desired number of shrouds have been operably mounted on the at least three towers.

A primary objective of the present invention is to provide a method for erecting a facility for producing electrical energy from wind, the method having advantages not taught by the prior art.

Another objective is to provide a method for erecting a facility that increases power production at the turbine shaft by a factor of approximately 3.3 over the production of the same size wind turbines not equipped with shrouds at the same wind speeds.

Another objective is to provide a method for erecting a facility that is able to produce power at wind speeds approximately two-thirds as great as the minimum speeds required to produce power by the same size turbines without shrouds, and the consequent ability to feasibly produce power in many geographical areas with normal wind speeds lower than required for conventional wind turbines.

Another objective is to provide a method for erecting a facility that is able, by virtue of the new geographical areas available for wind power, to provide power at or near the points of demand and reduction or elimination of the need for providing additional power transmission facilities for added power production. This location also reduces power losses due to transmission over long distances, thus reducing the cost of power to the user.

Another objective is to provide a method for erecting a facility that improves power production efficiency by routing the output from turbines to a battery of generators of different sizes that can operate in different ranges of optimum efficiency over a wider range of wind velocities.

Another objective is to provide a method for erecting a facility that is able to further improve power production efficiency by combining the flow of hydraulic fluid from the two pumps in a module to one set of controls, motors and generators.

Another objective is to provide a method for erecting a facility that includes a tower support structure that greatly reduce the amount of land required for wind power production relative to conventional wind power generation facilities. This construction also allows utilization or greater wind velocities at higher elevations relative to conventional wind power generation facilities.

A further objective is to provide a method for erecting a facility that can be scaled, larger or smaller, to meet a variety of needs.

A further objective is to provide a method for erecting that is safe for workers, with substantially all of the construction steps of the facility being performed in specially constructed work platforms, or adjacent the ground.

Other features and advantages of the present invention will become apparent from the following more detailed description, taken in conjunction with the accompanying drawings, which illustrate, by way of example, the principles of the invention.

BRIEF DESCRIPTION OF THE DRAWING

The accompanying drawings illustrate the present invention.

DETAILED DESCRIPTION OF THE INVENTION

The above-described drawing figures illustrate the invention, a facility 100 for producing electrical energy from a prevailing wind above a surface.

Figure 1B:
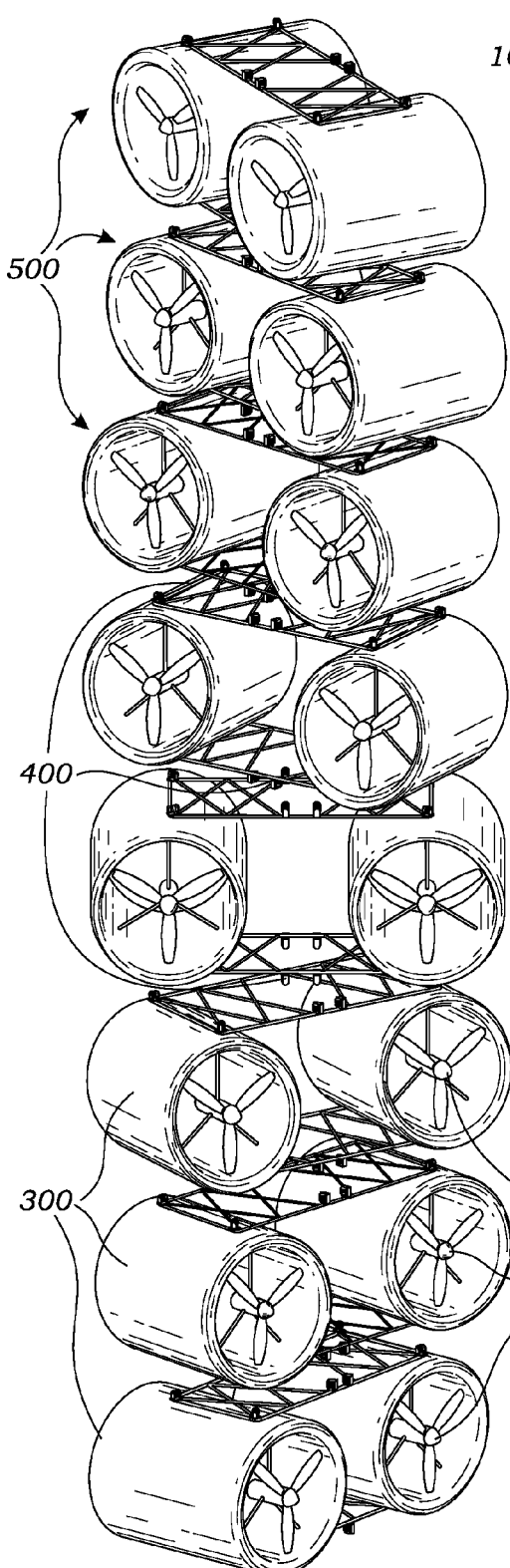
FIG. 1B is a perspective view of the multiple modules with the support structure removed.
Figure 1A:
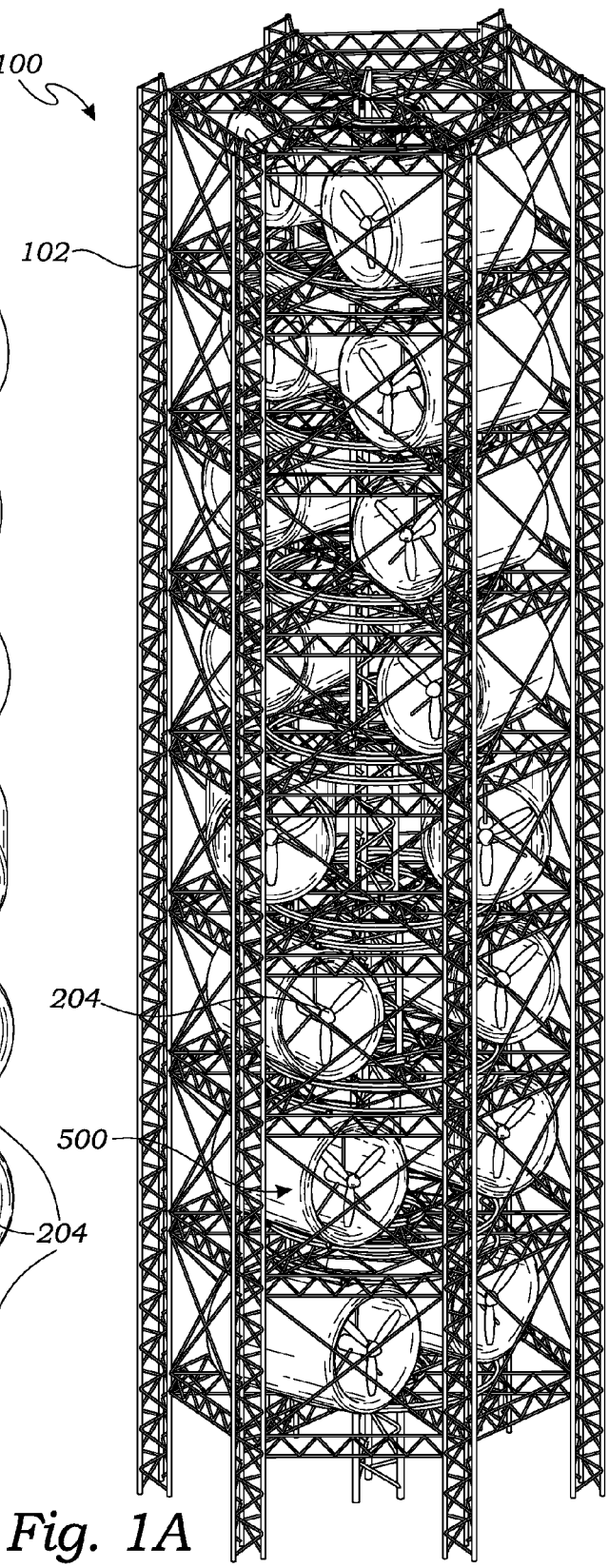
FIG. 1A is a perspective view of a facility illustrating a support structure and multiple modules, according to one embodiment of the present invention.

FIG. 1A is a perspective view of one embodiment of the facility 100. FIG. 1B is a perspective view of the facility 100 of FIG. 1A, with a support structure 102 removed to better illustrate multiple modules 500 of the facility 100. The embodiment, singly or in multiple installations, is most efficient in meeting large power demands where construction sites are at a premium and annual average wind speed is relatively low.

As illustrated in FIGS. 1A and 1B, the facility 100 includes a power system 200, a plurality of shrouds 300, a plurality of wind turbines 204, a plurality of modules 500, a plurality of pivotal mounting structures 400, and a support structure 102. The support structure 102 supports a large number of the wind turbines 204 far above the surface (e.g., ground, water, or other location) to both maximize the amount of wind captured, and also to minimize the footprint of the facility 100.

Figure 2:
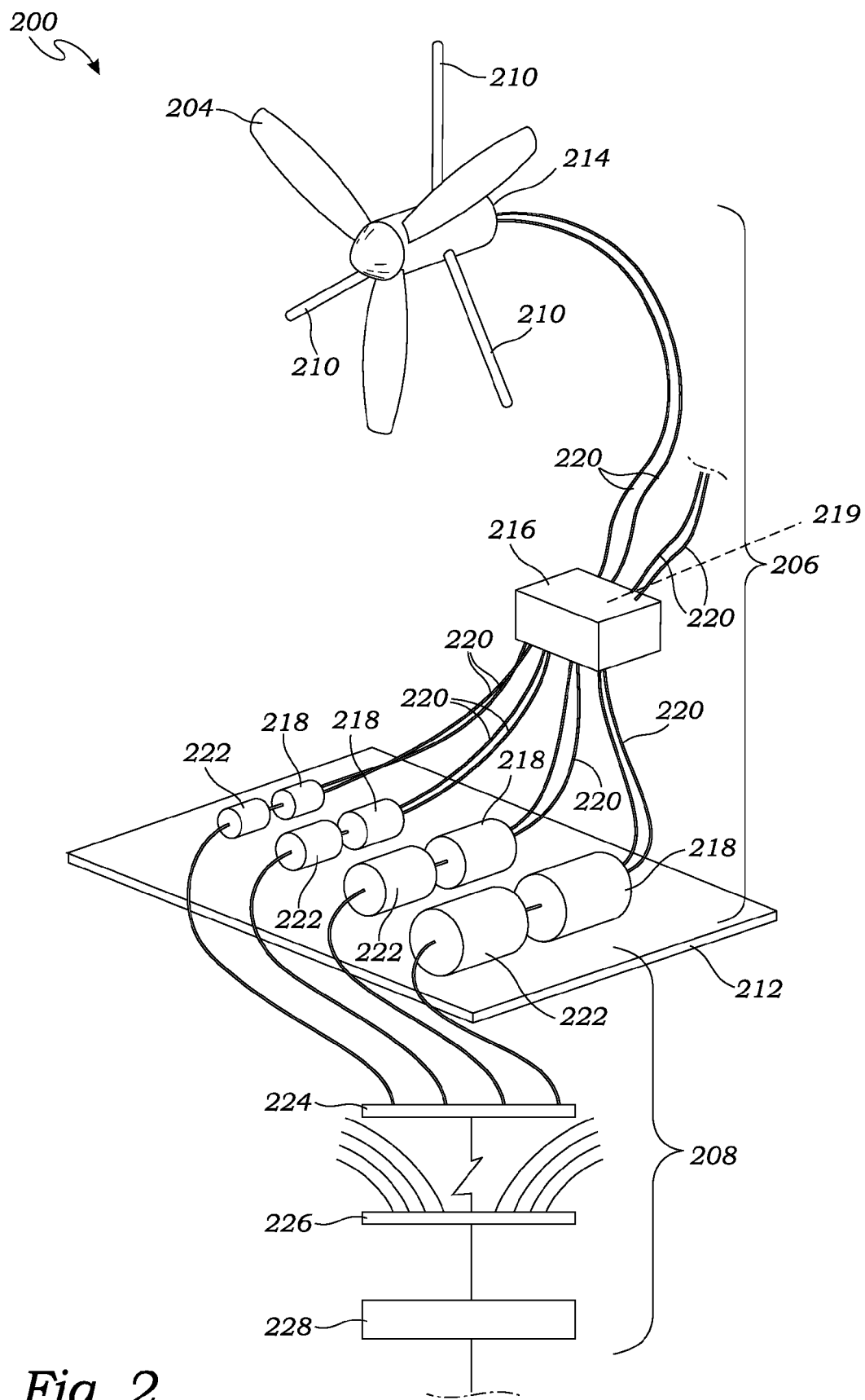
FIG. 2 is a schematic view of a power system of the facility.

FIG. 2 shows a schematic view of one embodiment of the power system 200. The power system 200 of FIG. 2 includes a wind turbine 204, a hydraulic system 206, an electrical system 208, struts 210, and a work platform 212. The hydraulic system 206 may include a pump 214, a control system 216, motors 218, and lines and other components 220. The hydraulic system 206 converts mechanical energy from the turbine 204, via the pump 214, to energy in the form of fluid flow. Fluid flow is then distributed to the appropriate hydraulic motors 218 by the control system 216. The hydraulic motors 218 then convert the fluid flow to mechanical energy which is transmitted to the generators 222.

The electrical system 208 includes direct current generators 222 increasing in size from small to large, module busses 224, a common direct current buss 226 and an optional alternating current electrical converter 228. The common direct current buss 226 and optional alternating current converter 228 may be located at a base of the facility 100 of FIG. 1A. The power system 200 of FIG. 2 may produce direct current electricity, or alternating current electricity compatible to a power grid.

The control system 216 of the power system includes distribution elements 219 (e.g., valves) for distributing fluid flow from the pump to different size motors 218 and a logic to optimize the production of power. The control system 216 can also accept flows from a plurality of pumps 214 in the modules 500, illustrated in FIG. 2.

The turbine 204, the pump 214, and a portion of the lines and other components 220 are supported by the struts 210. The struts 210 are in turn supported by the shroud 300 illustrated in FIG. 3A. The control system 216, motors 218, a portion of the electrical generation system 208, and a portion of the hydraulic lines and other components 220 are supported by the shroud 300, as discussed in greater detail below. While one embodiment of the power system 200 is illustrated, alternative power systems known in the art (e.g., mechanical gearing, and other alternatives) may also be utilized, and such alternative embodiments should be considered within the scope of the present invention.

Figure 3A:
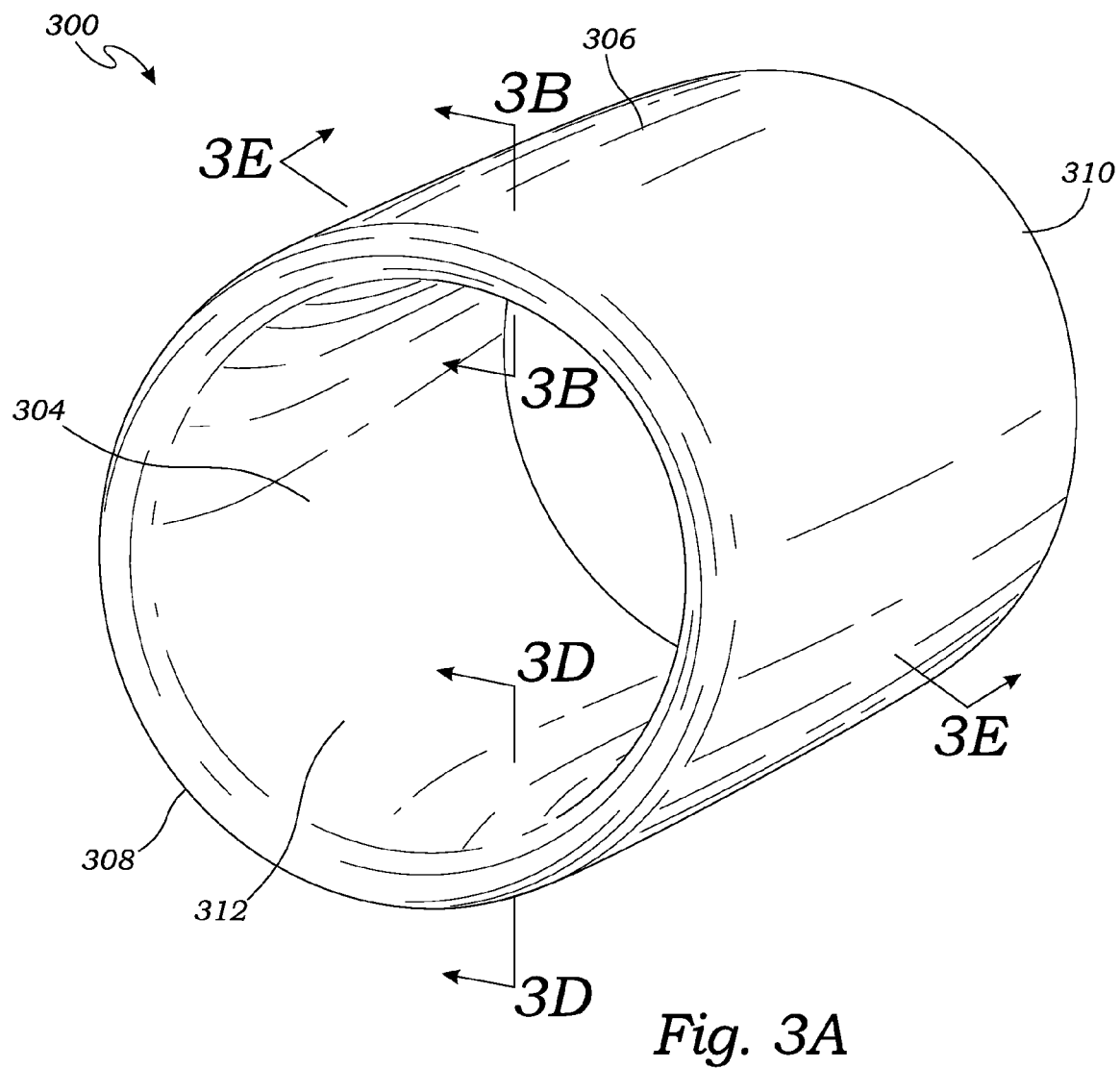
FIG. 3A is a perspective view of a shroud of the facility.
Figure 3B:
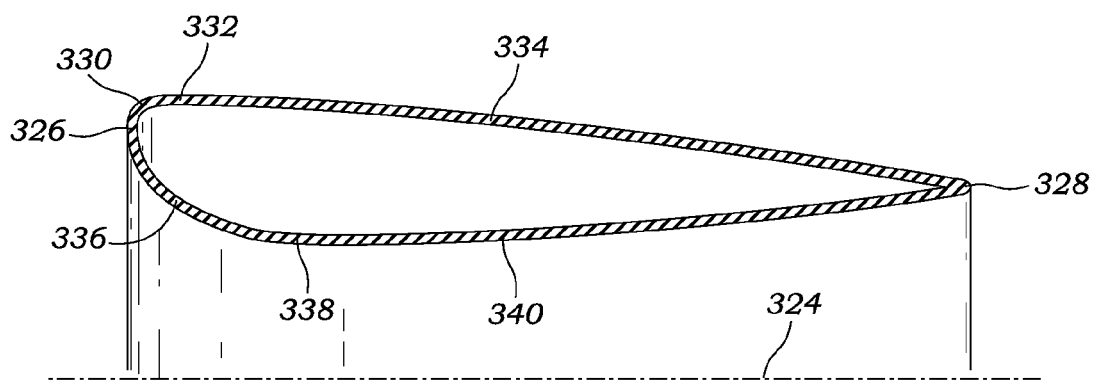
FIG. 3B is a sectional view of the shroud taken along line 3B-3B in FIG. 3A.

FIG. 3A shows one embodiment of one of the plurality of shrouds 300. FIG. 3B illustrates a section from FIG. 3A shroud 300. As illustrated in FIGS. 3A and 3B, the shroud 300 is an aerodynamic hollow shell located around the wind turbine 204, as illustrated in FIG. 1A. The shroud 300 of FIG. 3A may be a specially shaped toroid with a horizontal axis 324, an inner surface 304, and an outer surface 306. The shroud 300 also has a front 308 and a rear 310. This front and rear orientation also applies to all components of the modules 500, illustrated in FIG. 4. Wind approaches the shroud 300 from the front 308 and leaves the rear 310. The minimum diameter D of the inner surface 304 is the throat 312. The dimensions of the shroud 300 and other components of the facility 100 are proportional to the diameter D of the throat 312. As illustrated in FIG. 1A, the turbine 204 is located at the throat 312.

The shroud 300 of FIGS. 3A and 3B is a hollow shell of revolution, or toroid, formed by the path of FIG. 3B shape rotated a full circle of 360 degrees around the horizontal axis 324. FIG. 3B shape includes points 326, 328, 332, and 338, and lines 330, 334, 336, and 340. The front 308 of the FIG. 3A shroud 300 is more specifically defined as the circle generated by point 326 when FIG. 3B shape is rotated. Point 326 is located a distance of 0.7D from the axis 324, but may be located in the range of 0.55D to 0.95D from axis 324. The rear 310 of the FIG. 3A shroud 300 is more specifically defined as the circle generated by a point 328 when FIG. 3B shape is rotated. Point 328 is a horizontal distance of 1.5D to the rear of the vertical plane containing point 326, but may be located in the range of 0.5D to 2.5D to the rear of point 326.

As illustrated in FIG. 3B, the outer surface 306 of the shroud 300 of this embodiment includes an outer front curve 330 that begins at point 326 going away from and perpendicular to axis 324. The direction of curve 330 may vary as much as fifteen degrees away from perpendicular to axis 324. Curve 330 terminates going parallel to and a distance of 0.75D from axis 324 at point 332. The direction of curve 330 at its termination may vary as much as ten degrees away from parallel to axis 324. The distance of point 332 from axis 324 may vary from 0.6D to 2D. Point 332 is a horizontal distance of 0.075D to the rear from point 326. Point 332 may vary from 0.05D to 1.5D to the rear from point 326. Curve 330 is a quadrant of an ellipse in the first embodiment, but may take any shape. The outer rear line 334 in FIG. 3B shape begins at point 332 and terminates at point 328. Line 334 varies in slope relative to axis 324 in the first embodiment. The minimum slope of line 334 is 4 degrees toward axis 324 at point 332 and the maximum slope is 6.5 degrees toward axis 324 at point 328. The slope of line 334 may vary from parallel to axis 324 to fifteen degrees toward axis 324.

As illustrated in FIG. 3B, the inner surface 304 includes an inner front curve 336 that begins at point 326 going toward and perpendicular to axis 324. The direction of curve 336 at its origin may vary as much as fifteen degrees away from perpendicular to axis 324. Curve 336 terminates going parallel to and a distance of 0.5D from axis 324 at point 338. The direction of curve 336 at its termination may vary as much as ten degrees away from parallel to axis 324. In the present embodiment, point 338 is a horizontal distance of 0.3D to the rear from point 326. In alternative embodiments, point 338 may vary from 0.1D to 1.5D to the rear from point 326. Curve 336 is a quadrant of an ellipse in the first embodiment, but may be alternative shapes in different embodiments. The path of point 338, when rotated about the axis, forms the throat 312 of the shroud 300. The inner rear line 340 in the FIG. 3B shape begins at point 338 and terminates at point 328. Line 340 varies in slope relative to axis 324. The minimum slope of line 340 is 4 degrees away from axis 324 at point 338. The maximum slope of line 340 is 6.5 degrees away from axis 324 at point 328. The slope of line 340 may vary from zero degrees to fifteen degrees away from axis 324.

Figure 3C:
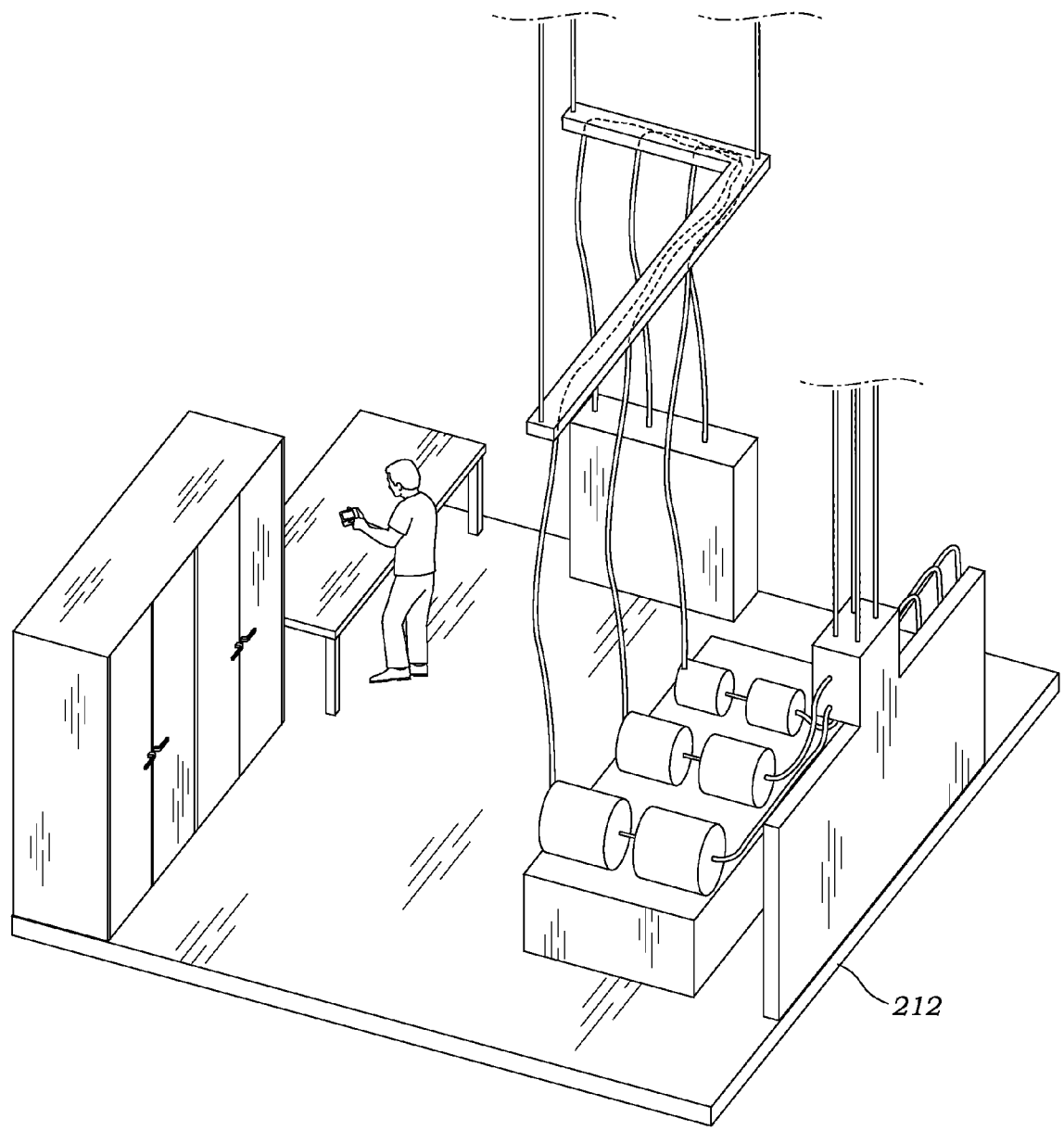
FIG. 3C is a perspective view of a work platform of the facility.
Figure 3D:
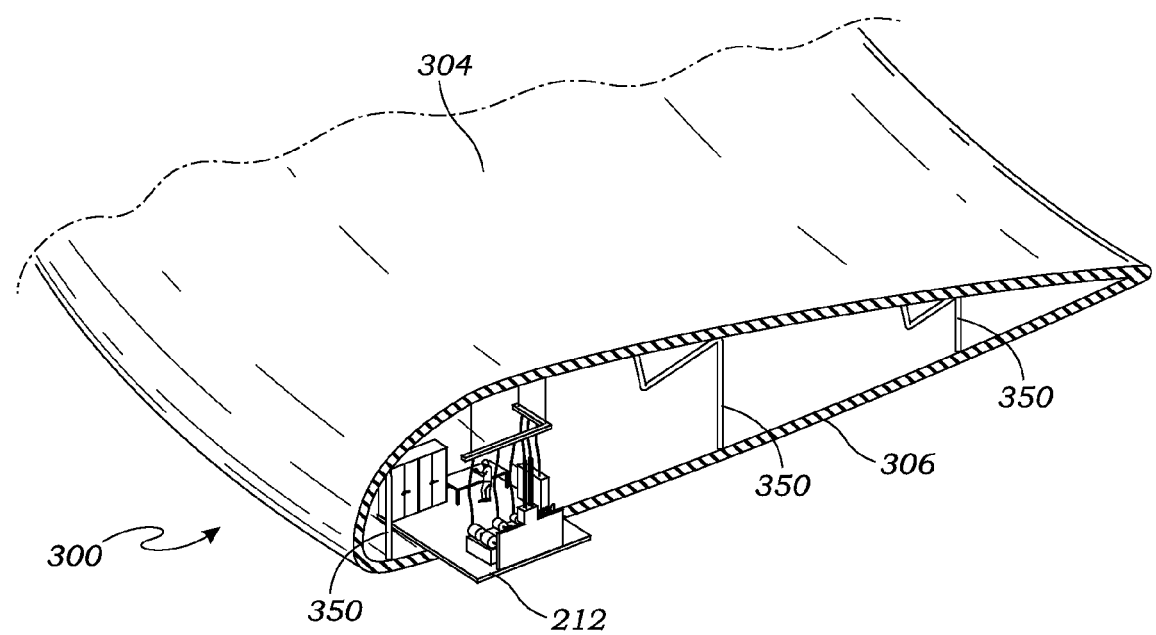
FIG. 3D is a perspective cutaway of the shroud showing the work platform of FIG. 3C positioned within the shroud of FIG. 3, and also illustrating internal supports in the shroud.
Figure 3E:
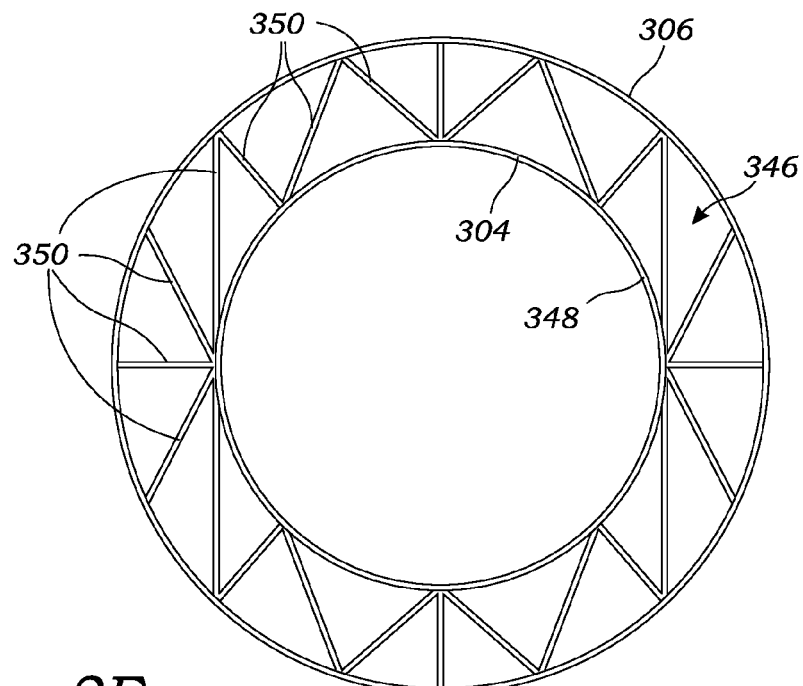
FIG. 3E is a front elevation sectional view of the shroud interior structure system, taken along line 3E-3E in FIG. 3A.

FIG. 3C is a perspective view of one embodiment of the work platform 212 of the power system 200. FIG. 3D is a perspective cutaway of the shroud 300 showing the work platform 212 of FIG. 3C positioned within the shroud 300 of FIG. 3A. In the embodiment of FIGS. 3C and 3D, the work platform 212 is positioned within the shroud 300 and contains the control system 216, motors 218, a portion of the electrical generation system 208, and a portion of the hydraulic lines and other components 220 illustrated in FIG. 2. In this embodiment, the shroud 300 serves the added purpose of containing and protecting the work platform 212 and the above-mentioned components, and providing a safe location for maintenance workers to work on these components. The shroud 300 shall include the power system 200 except the DC buss 226 and the optional AC converter 228 that may be located at the base of the facility 100. The outer surface 306 and inner surface 304 of the shroud 300 may be supported by internal supports 350 as shown in FIG. 3D and FIG. 3E. While the work platform 212 may be internal to the shroud 300, it may also be located elsewhere if desired, or if the shroud 300 is not big enough to accommodate it.

FIG. 3E is a front elevation sectional view of the shroud interior structure system 346. The shroud interior structure system 346 includes internal supports 350 between the inner surface 304 and the outer surface 306. While one arrangement of internal supports 350 is illustrated, alternative structures and arrangements may also be used, and such alternatives known in the art should be considered within the scope of the present invention.

Figure 4:
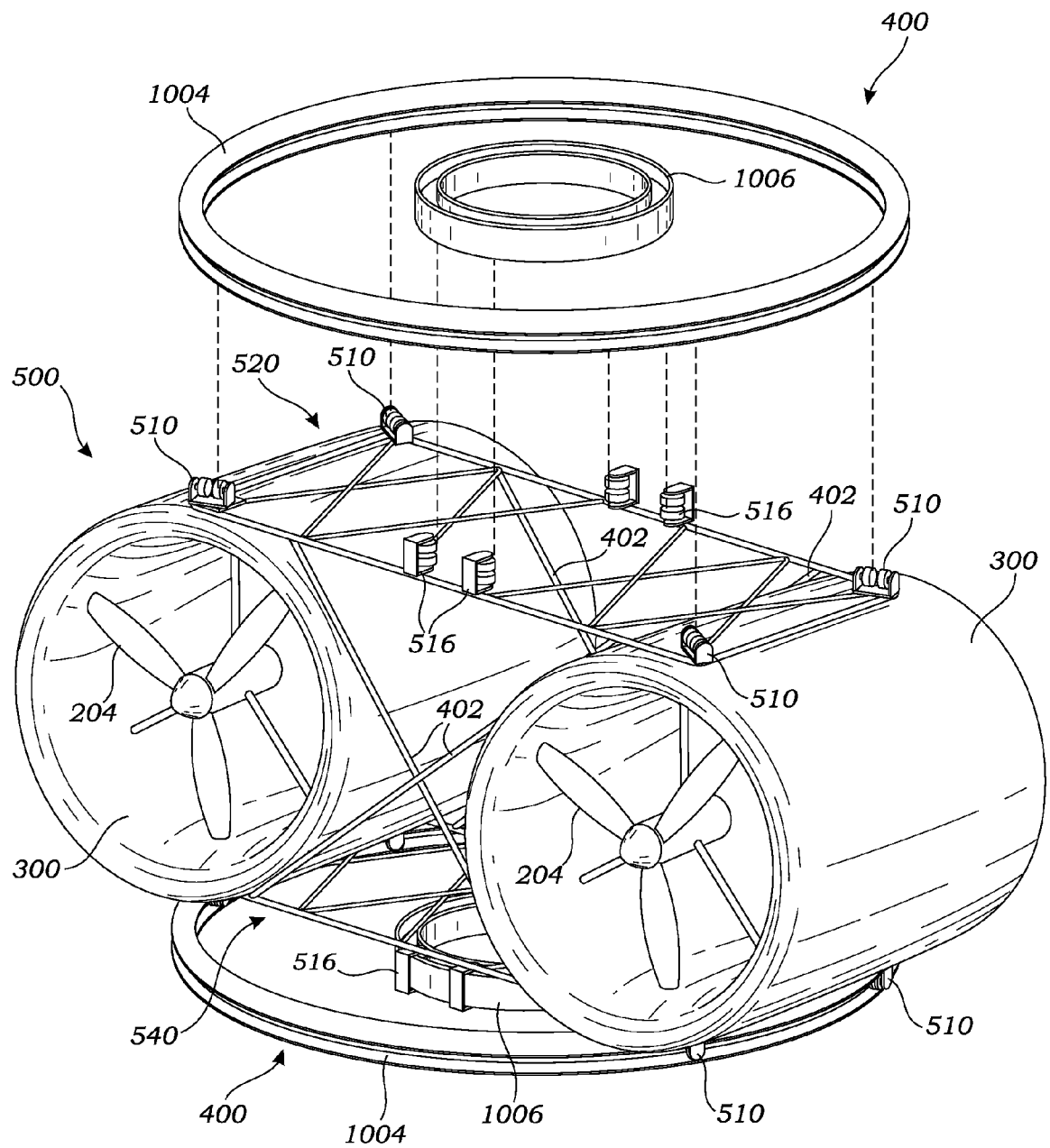
FIG. 4 is an exploded perspective view of the module and rails upon which the module is rotatably mounted.

FIG. 4 is an exploded perspective view of the module 500 and rails 1004 and 1006 upon which the module 500 is rotatably mounted. As illustrated in FIG. 4, the module 500 is supported by a pivotal mounting structure 400 for mounting each of the modules 500 so that it may pivot with respect to the support structure 102. In this embodiment, the pivotal mounting structure 400 is partially comprised of rails 1004 and 1006 upon which the module 500 is rotatably mounted. Furthermore, as FIG. 4 illustrates, each module 500 includes two shrouds 300 (illustrated in FIG. 3A), and portions of the power system 200 (illustrated in FIG. 2) located in the shrouds 300. In alternative embodiments, each module may include more than two shrouds 300, and the shrouds 300 may be disposed in different arrangements (e.g., a pair of shrouds 300 on either side, either side by side or stacked, or alternative numbers and arrangements of shrouds 300). Such alternatives should be considered within the scope of the present invention.

As illustrated in FIG. 4, each module 500 may further include frames for connecting the shrouds 300. In the embodiment of FIG. 4, the module 500 may include an upper frame 520 (illustrated in FIG. 5A), and a lower frame 540 (illustrated in FIG. 5C). The upper frame 520 as illustrated in FIG. 5A and the lower frame 540 as illustrated in FIG. 5C hold the shrouds 300 in position and support them on opposite sides of the core tower 800, as illustrated in FIG. 1A. Trucks 510 and 516 as illustrated in FIG. 4 are attached to the upper and lower frames 520 and 540 and are assembled onto outer rails 1004 and inner rails 1006 within the pivotal mounting structure 400, such that the module 500 may rotate.

FIG. 5A is a perspective view of an upper frame 520. As illustrated in FIGS. 4 and 5A, the upper frame 520 includes frame beams 502 connected to the top of the shrouds 300 at the front ends 504 and at the rear ends 506 of the beams 502. Beams 502 are preferably directly above axis 324. Other convenient shroud 300 load points 508 may also be connected to the beams 502. The upper frame 520 may further include a front bar 512 between the two beam front ends 504, and a rear bar 514 between the two beam rear ends 506.

Figure 5B:
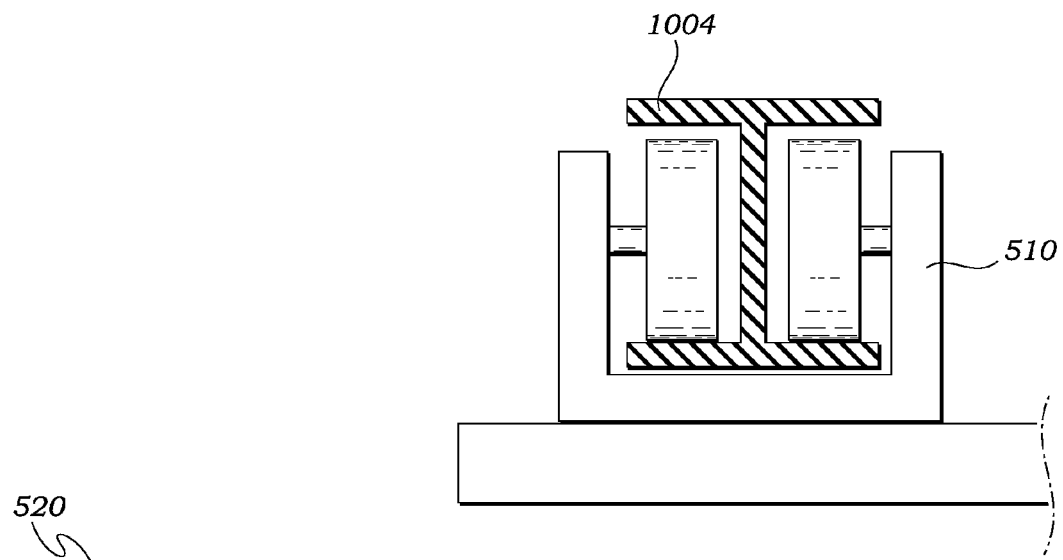
FIG. 5B is a detail of an outer truck.
Figure 5A:
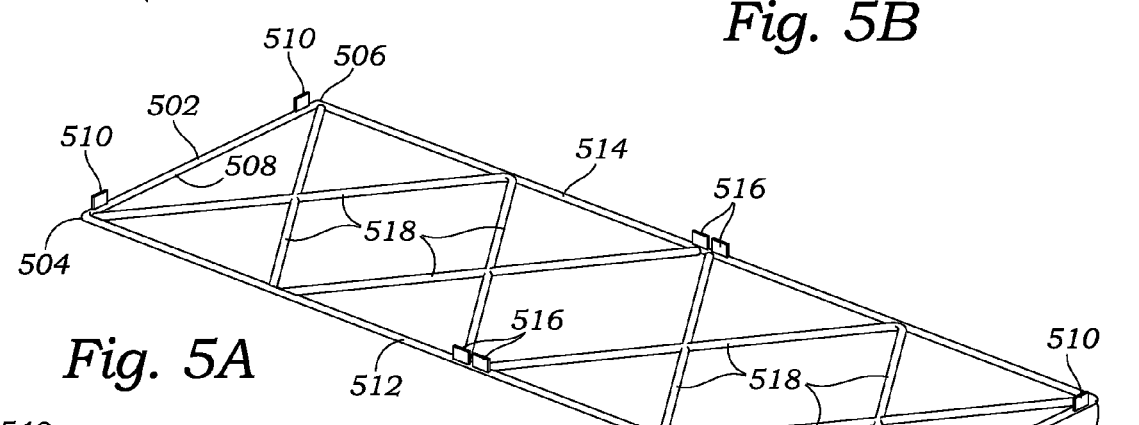
FIG. 5A is a perspective view of an upper frame.
Figure 5C:
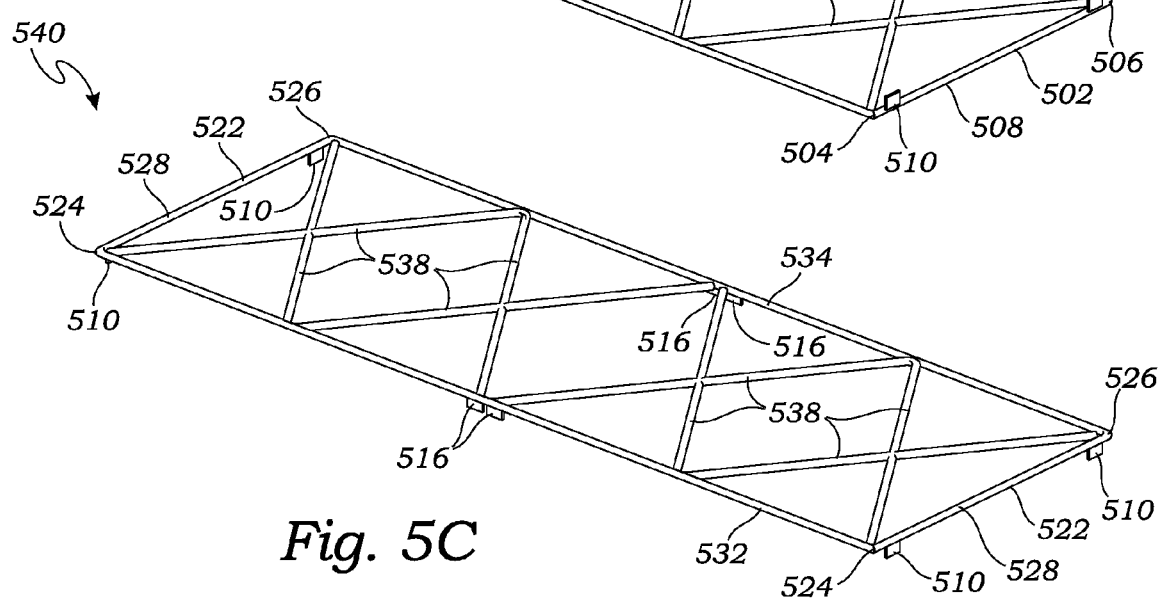
FIG. 5C is a perspective view of a lower frame.

FIG. 5B is a detail of the outer truck 510. As illustrated in FIGS. 4 and 5B, the upper frame 520 includes one or more mounted pairs of wheels, or trucks 510, attached above the four beam ends 504 and 506. These trucks 510 transmit the vertical loads from the module 500 to the outer rail 1004, as illustrated in FIG. 4. In the embodiment of FIGS. 4, 5A, and 5B, the pivotal mounting structure 400 is comprised of the rails 1004 and 1006 and trucks 510 and 516 described herein. The pivotal mounting structure 400 may also include alternative embodiments known to those skilled in the art.

FIG. 5C illustrates one embodiment of the lower frame 540. In many respects the FIG. 5C lower frame 540 is equivalent to the FIG. 5A upper frame 520, except it is turned upside-down to be located at the bottom of the FIG. 4 module rather than at the top. The specific differences of FIG. 5C lower frames 540 from FIG. 5A upper frames 520 are as follows: The shrouds 300 of FIG. 3A are connected to the top of the beam ends 524 and beam ends 526 of the beams 522. Trucks 510 are attached to the bottom of the beam ends 524 and beam ends 526 of beams 522. Other convenient shroud 300 load points 528 may also be connected to the beams 522. Trucks 516 are attached to the bottom of the front bar 532 and to the bottom of the rear bar 534. Trucks 510 and trucks 516 are assembled with outer rails 1004 and inner rails 1006 located below.

Figure 5D:
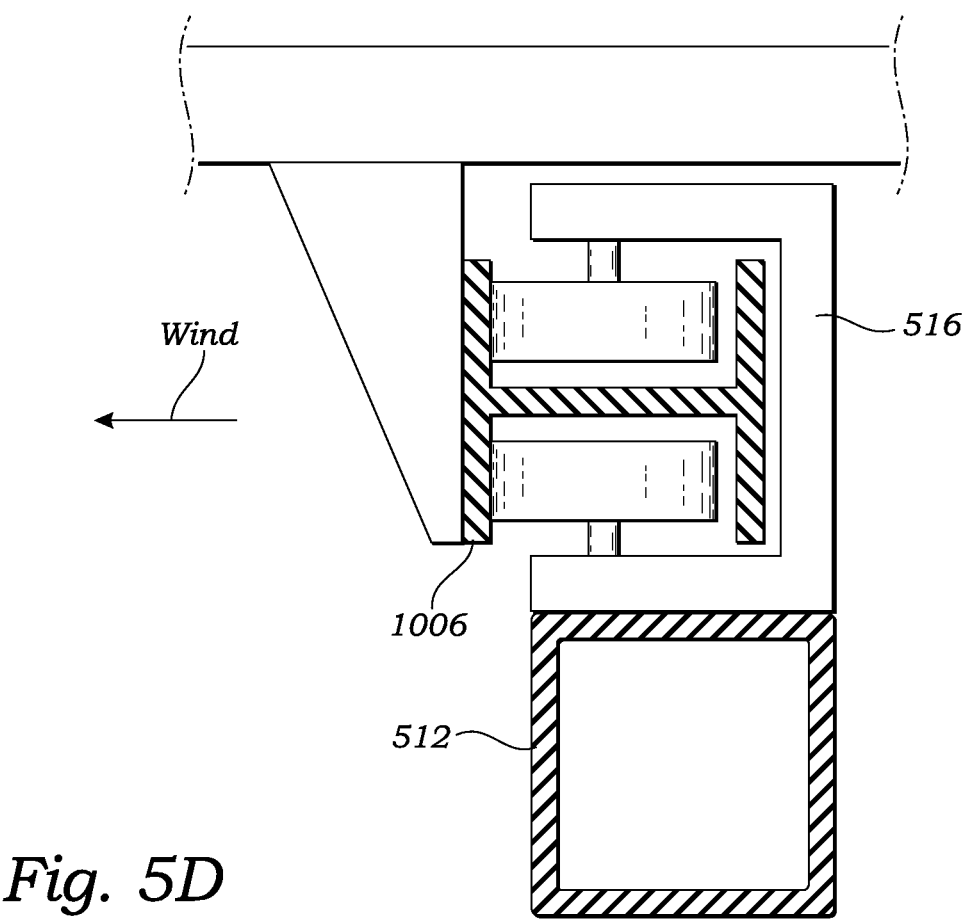
FIG. 5D is a detail of a front inner truck.
Figure 5E:
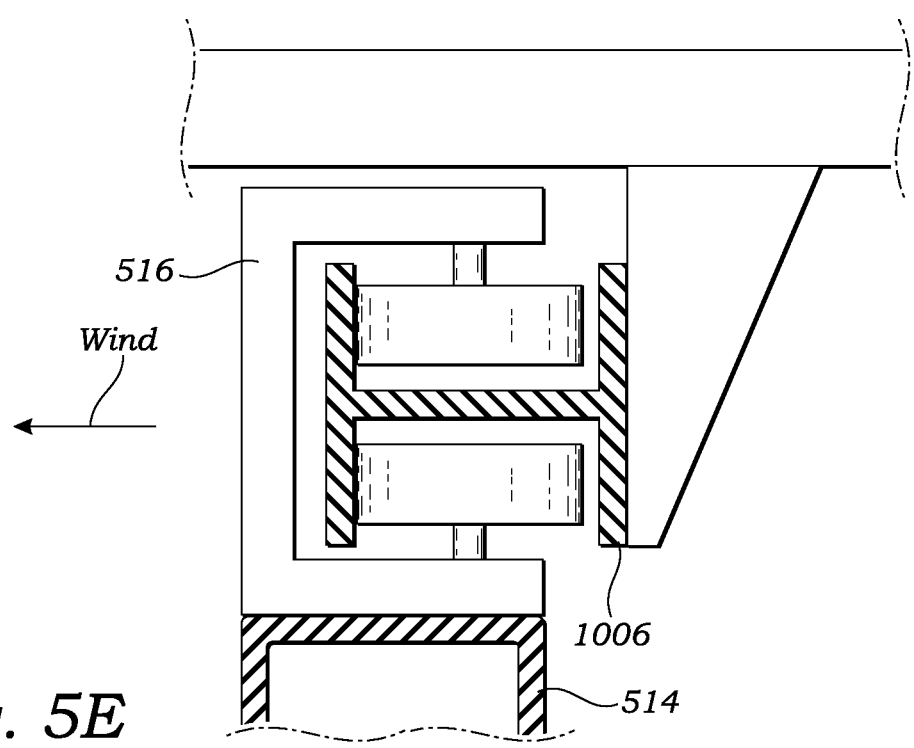
FIG. 5E is a detail of a rear inner truck.

As illustrated in FIG. 4, and FIGS. 5D and 5E, a plurality of trucks 516 are attached to the upper frames 520 for engaging the inner rails 1006, for supporting horizontal loads placed upon the shrouds 300 by the wind. FIG. 5D is a detail of the front inner truck 516. FIG. 5E is a detail of the rear inner truck 516. The front trucks 516 are attached above the front bar 512, and may be centered on its mid-point; and the rear trucks 516 may be attached above the rear bar 514, and likewise may be centered on its mid-point. These trucks 516 are positioned to transmit the horizontal load from the upper frame 520 to the inner rail 1006 (of FIG. 5E). A plurality of trucks 516 are attached to the lower frames 540 in locations similar to their locations on upper frames 520, and for the same purpose, but they are attached below the front bar 532 and rear bar 534.

As illustrated in FIGS. 5A and 5C, truss members 518 and 538 transmit the frame 520 and 540 horizontal loads from the beam 502 and beam 522 front ends 504 and 524 and rear ends 506 and 526 to the plurality of trucks 516 (as best illustrated in FIG. 4). These truss members 518 and 538 are arranged to provide stable structures for transmitting the horizontal load from beams 502 and 522 to trucks 516. In the present embodiment, all the upper frame 520 members 502, 512, 514 and 518, except the trucks 510 and 516, are aligned on one horizontal plane. Similarly, all the lower frame 540 members 522, 532, 534 and 538, except trucks 510 and 516, are aligned on one horizontal plane.

As illustrated in FIG. 4, trucks 510 and 516 roll on circular rails 1004 and 1006, respectively, fixed to the support structure 102 illustrated in FIG. 7, both above and below each module 500. The trucks 510 and 516, and rails 1004 and 1006, allow the module 500 of FIG. 4 to rotate around the core tower 800 (illustrated in FIG. 8). The trucks 510 and 516 are part of the module 500 of FIG. 4. The rails 1004 and 1006 are part of the support structure 102 of FIG. 7. The outer truck 510 of FIG. 5B engages the outer rail 1004. The inner trucks 516 of FIGS. 5D and 5E engage the inner rails 1006 in the front and rear of the modules 500 of FIG. 4.

The module 500 of FIG. 4 shows module guy pairs 402, which are pairs of cables connecting diagonally between the upper frame 520 of FIG. 5A and the lower frame 540 of FIG. 5C. One module guy pair 402 is located in a vertical plane at the front of the upper frame 520 and the lower frame 540. Another guy pair 402 is located in a vertical plane at the rear of the upper frame 520 and the lower frame 540. These module guy pairs 402 provide structural and dimensional stability to each module 500.

Figure 6:
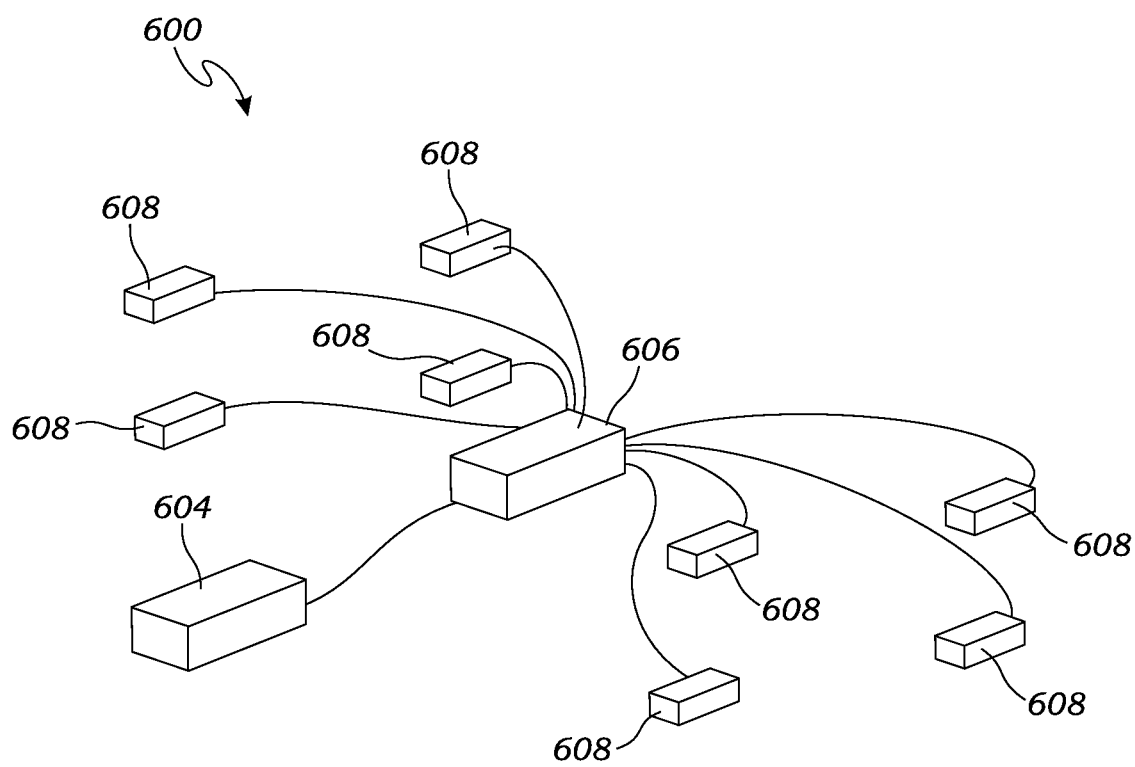
FIG. 6 is a schematic view of the module control system.

FIG. 6 is a schematic drawing of a module control system 600 included in each of the modules 500 of FIG. 4. The module control system 600 includes a wind direction sensing device 604, a module control device 606, and a plurality of electric motors 608 for driving a plurality of outer trucks 510. The module control system 600 is installed in each module 500 to keep it positioned facing the prevailing wind. When the wind direction sensing device 604 senses a change in the direction of the wind, using technology known to those skilled in the art, the module control device 606 controls the electric motors 608 to turn the module 500 in a manner that maintains the module 500 in the correct orientation with respect to the wind.

Figure 7:
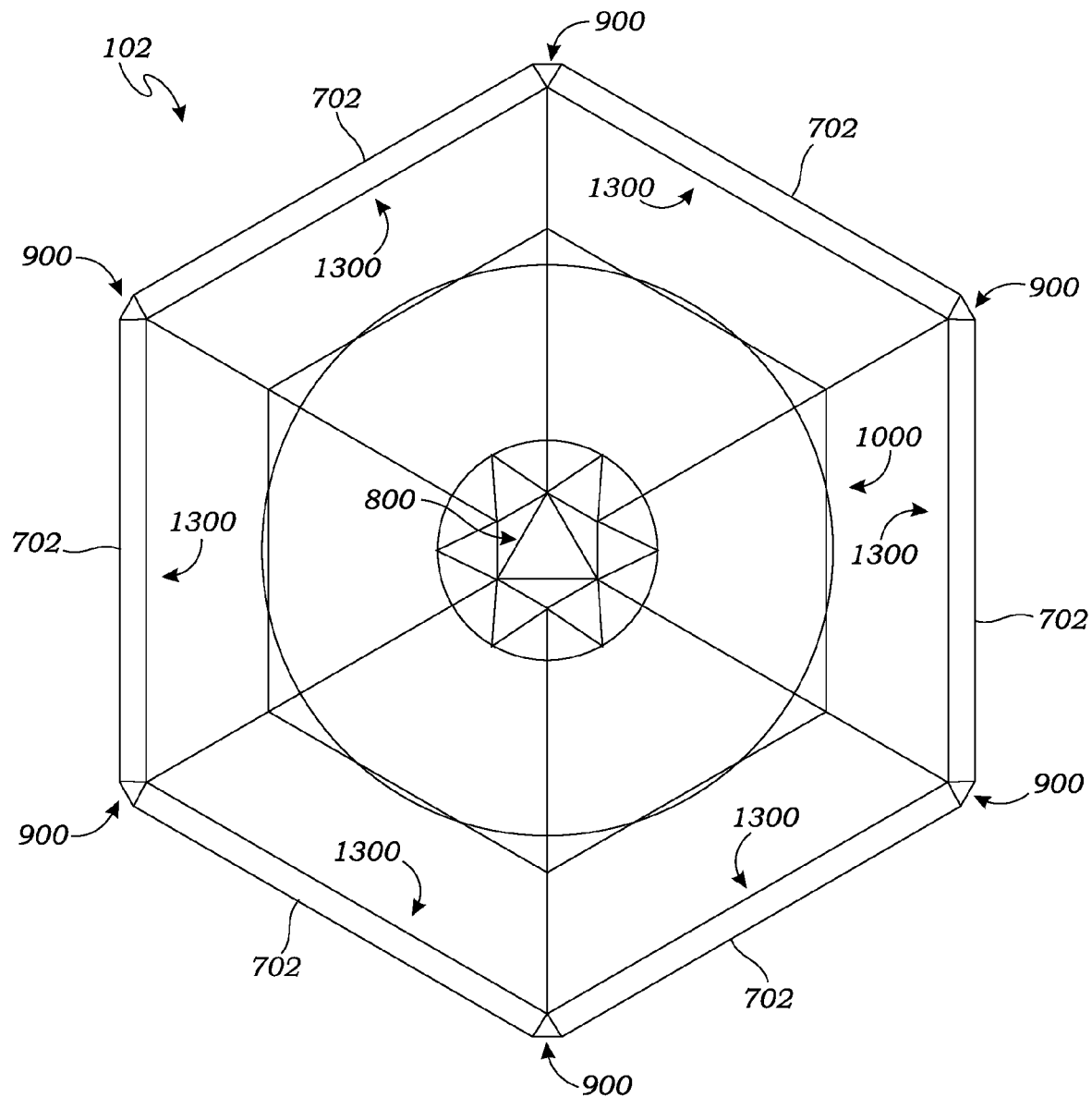
FIG. 7 is a plan view of a truss and rail system for supporting the modules.

FIG. 7 shows a plan view of one embodiment of the support structure 102. The support structure 102 of this embodiment includes a core tower 800 (also illustrated in FIG. 8), peripheral towers 900 (also illustrated in FIG. 9), a truss and rail system 1000 (also illustrated in FIG. 10), a peripheral truss 1300 (also illustrated in FIG. 13), and guys 702. In this embodiment there are six peripheral towers 900; however, this number may vary depending upon the requirements of those skilled in the art (three or greater may be used).

Figure 8:
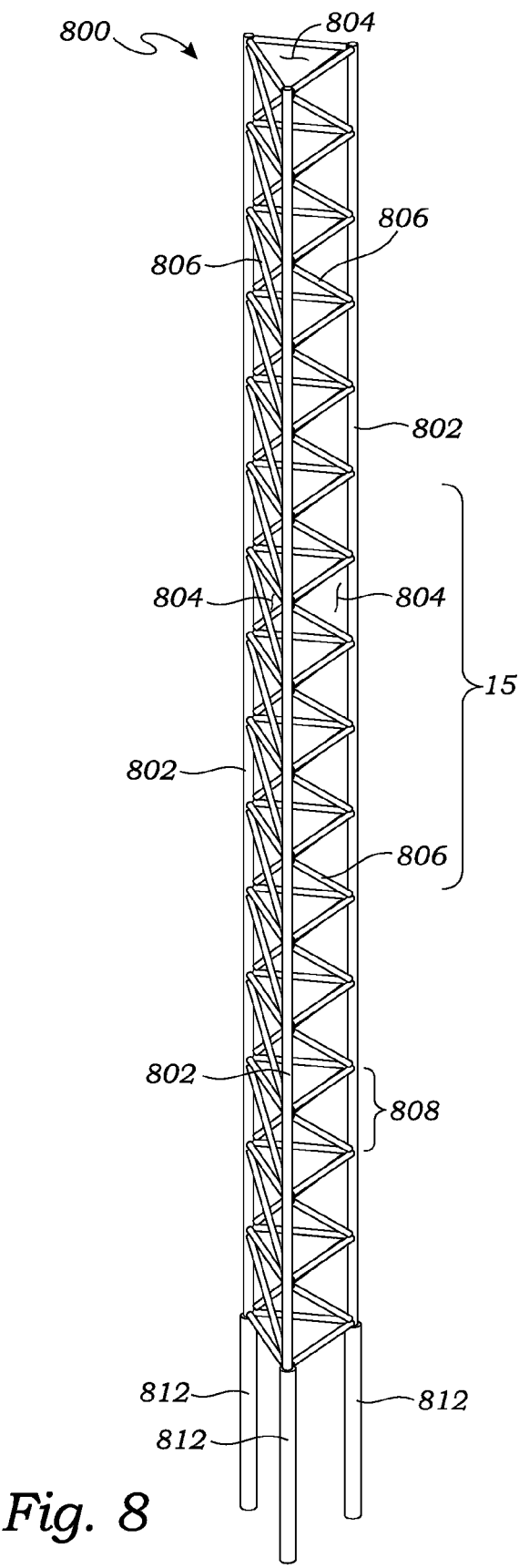
FIG. 8 is a perspective view of a core tower.

FIG. 8 is a perspective view of one embodiment of the core tower 800. The FIG. 8 core tower 800 has three vertical legs 802 forming an equilateral triangle (although other configurations are also possible). The legs 802 are separated by a horizontal distance of 0.433D identified as a face 804 of the FIG. 8 core tower 800. The distance between legs 802 may vary from 0.1D to 0.7D. Each of the three faces 804 has a pattern of lacings 806 between the legs 802. This lacing pattern 806 is repeated at vertical intervals, which vertical intervals are the definition of a panel 808 of the FIG. 8 core tower 800. A section 15 of the FIG. 8 core tower 800 is defined as enough panels 808 combined into a vertical stack to equal the vertical distance between the centerlines of FIG. 10 truss and rail systems 1000. FIG. 11 ring trusses 1100 are attached at the middle of the top panel 808 of each section 15. The bottom of each leg 802 is supported by a foundation 812 which may be any configuration appropriate for the soils at a specific site and the loads imposed.

Figure 9:
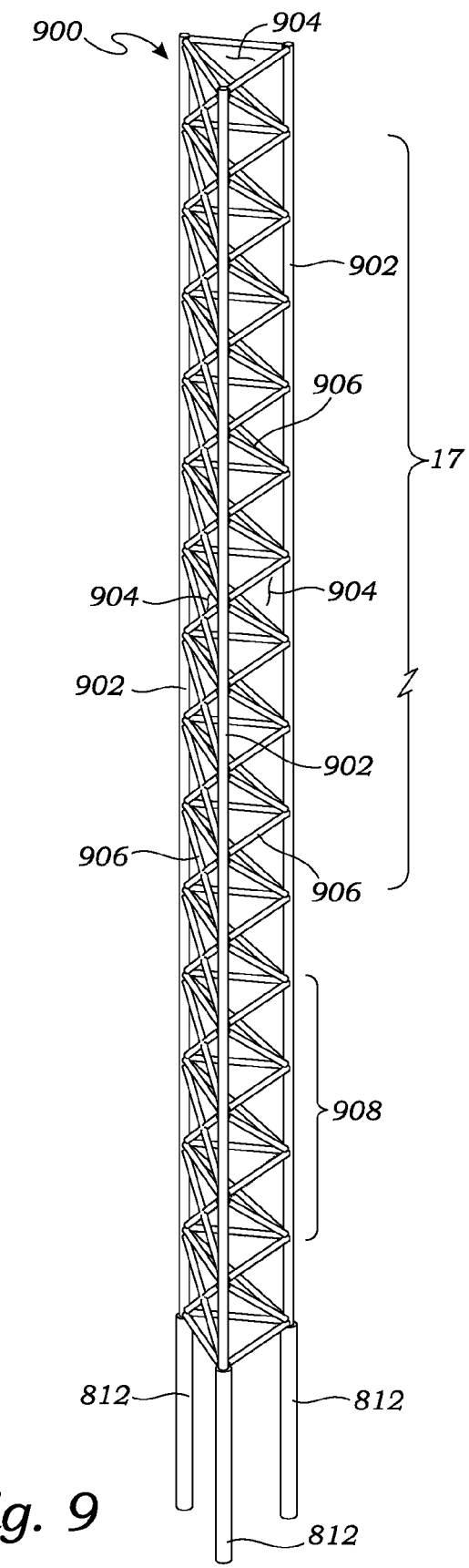
FIG. 9 is a perspective view of a peripheral tower.
Figure 12:
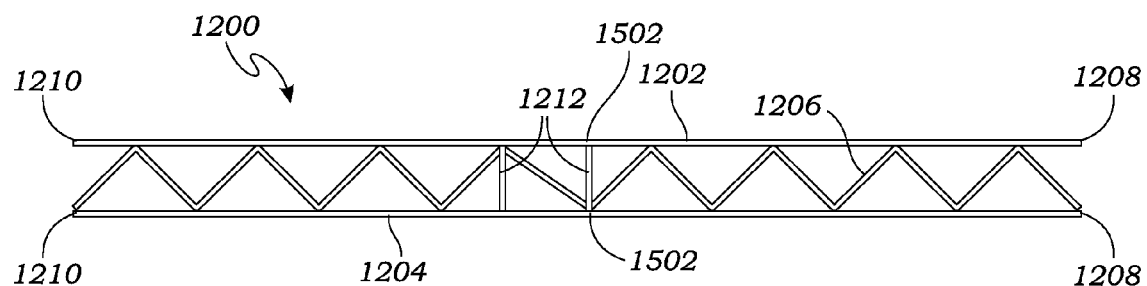
FIG. 12 is an elevation view of a radial truss.

FIG. 9 is a perspective view of one embodiment of the peripheral tower 900. The FIG. 9 peripheral tower 900 has three vertical legs 902 forming an equilateral triangle (although other configurations are also possible). One of the legs 902 is oriented toward the center of the core tower 800 (of FIG. 8). Legs 902 are separated by a horizontal distance of approximately 0.10D, which is identified as a face 904 of the peripheral tower 900. The face 904 width may vary from 0.05D to 0.25D, in the preferred embodiment, but may vary beyond this in alternative embodiments. Each of the three faces 904 has a pattern of lacings 906 between the legs 902. This pattern of lacings 906 is repeated at vertical intervals a whole number of times, approximately 3 or 4, to form a panel 908 of the peripheral tower 900. The height of panel 908 is equal to the height of panel 808 of the core tower 800 (of FIG. 8). Thus the height of the panel 808 is the definition of the height of panel 908 of the peripheral tower 900. A section 17 of the peripheral tower 900 is defined as enough panels 908 combined into a vertical stack to equal the vertical distance between the centerlines of FIG. 10 truss and rail systems 1000. FIG. 12 radial trusses 1200 and FIG. 13 peripheral trusses 1300 are attached at the middle of the top panel 908 of each section 17. The bottom of each leg 902 is supported by a foundation 812 configured appropriately for the soils at each site and the loads imposed.

Figure 10:
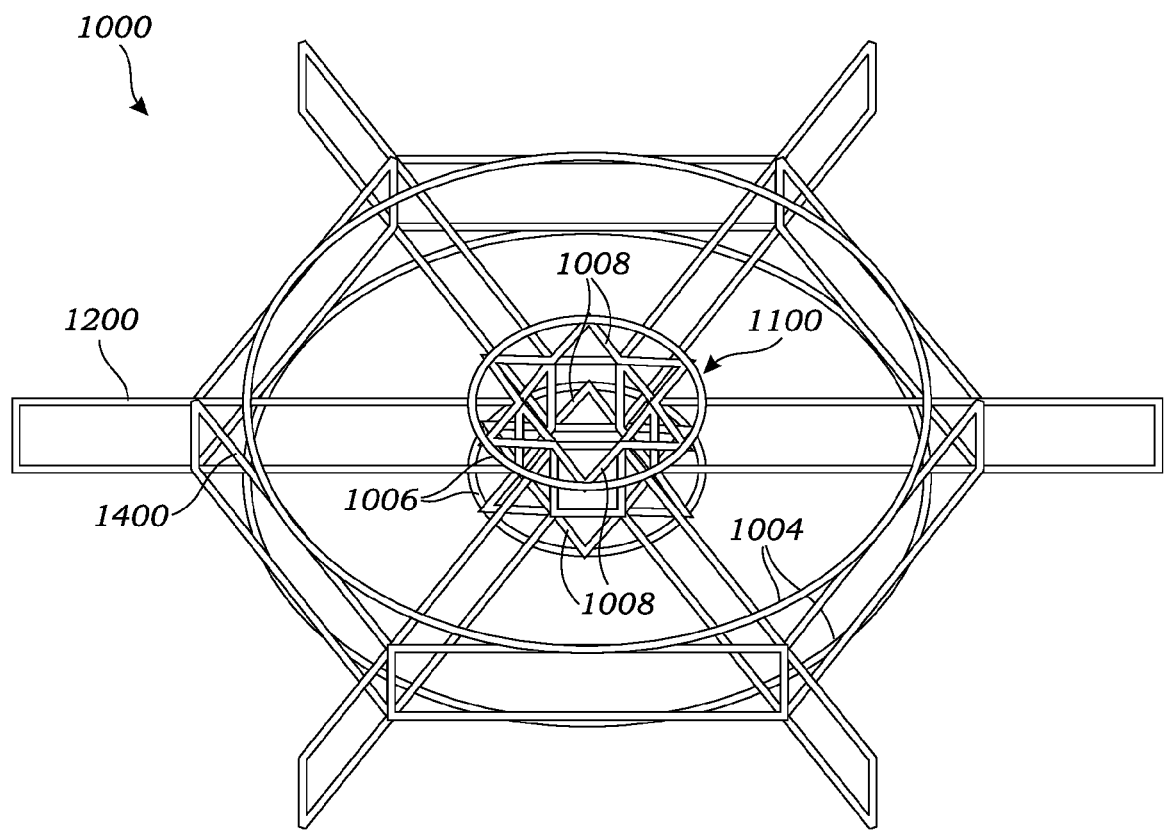
FIG. 10 is a perspective view of a truss and rail system.
Figure 11:
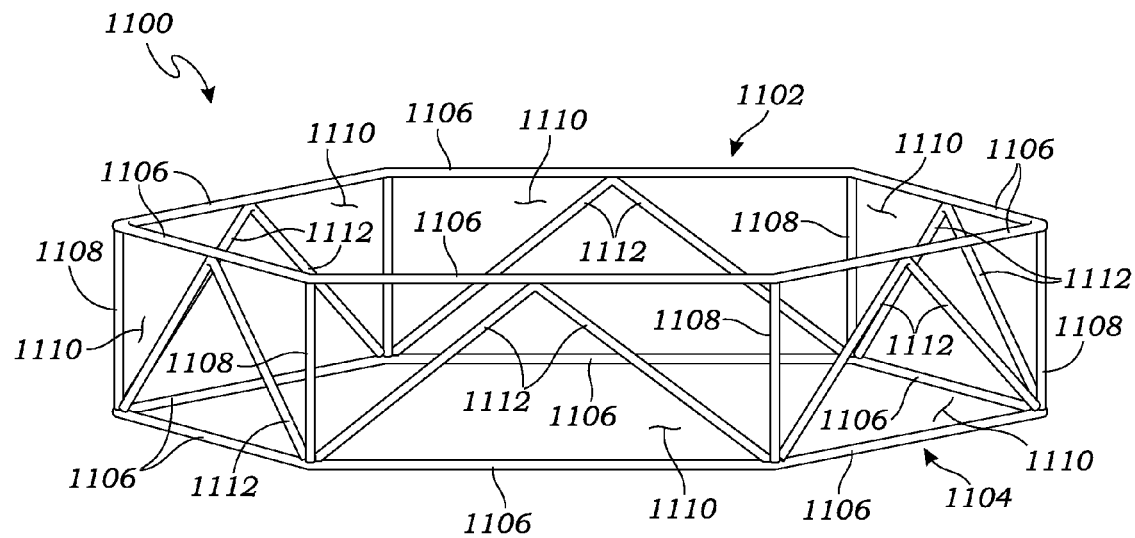
FIG. 11 is a perspective view of a ring truss.

FIG. 10 is a perspective view of one embodiment of the truss and rail system 1000, which represents one embodiment of a pivotal support utilized in the present invention. Other forms of the pivotal support may also be utilized for supporting the modules 500, so that the modules may pivot to face the wind, and such alternatives should also be considered within the scope of the present invention. As illustrated in FIG. 10, the truss and rail system 1000, as discussed above, may pivotally support the modules 500 and may provide lateral structural support to the core and peripheral towers 800 and 900. While the truss and rail system 1000 illustrated is one embodiment, alternative constructions may be used to support modules 500, to allow the modules 500 to pivot to face the wind, and to provide lateral support to towers 800 and 900, and such alternatives should be considered within the scope of the present invention.

The truss and rail system 1000 illustrated in FIG. 10 connects the core tower 800 (of FIG. 8) to the peripheral towers 900 (of FIG. 9). The truss and rail system 1000 of FIG. 10 is comprised of a ring truss 1100, a plurality of radial trusses 1200 spanning between the ring truss 1100 each peripheral tower 900, rail trusses 1400 spanning between adjacent radial trusses 1200, one or more outer rails 1004, one or more inner rails 1006 and braces 1008. Outer rails 1004 and inner rails 1006 are provided as needed to receive vertical and horizontal loads respectively from outer trucks 510 and inner trucks 516 of the FIG. 4 modules 500. Braces 1008 provide supplemental lateral support to inner rails 1006 by connecting them to the ring truss 1100. The truss and rail systems 1000 are spaced at vertical intervals sufficient to allow the FIG. 4 modules 500 to be supported between them, a distance of approximately 1.75D in this embodiment. Individual modules 500 may be omitted at the discretion of the owner and the space left empty to be used for other purposes.

FIG. 11 shows the first embodiment of ring truss 1100. The FIG. 11 ring trusses 1100 include a top ring 1102 and a bottom ring 1104. Each ring 1102 and 1104 includes six equal members 1106. If more or less than six FIG. 9 peripheral towers 900 are used, the number of members in the rings 1102 and 1104 are modified to match. The lengths of the members 1106 of the FIG. 11 ring truss 1100 are sufficient for it to span around the FIG. 8 core tower 800 and connect to the FIG. 8 core tower 800 legs 802. The vertical distance between rings 1102 and 1104 is 0.1167D, but may vary from 0.05D to 0.25D. Each corner of the top ring 1102 is connected to the corner of the bottom ring 1104 directly below with a vertical strut 1108. Each portion of the FIG. 11 ring truss 1100 between adjacent struts 1108 is defined as a face 1110 of the FIG. 11 ring truss 1100. Each of the faces 1110 has a pattern of lacings 1112 between the adjacent struts 1108 to provide structural stability to the faces 1110. Each FIG. 11 ring truss 1100 is positioned around the FIG. 8 core tower 800 so some of its corners align vertically with the legs 802 of the FIG. 8 core tower 800. These aligned corners are attached to the FIG. 8 core tower 800 at the middle of the top section 808 of each section 15.

FIG. 12 is an elevation view of the first embodiment of the radial truss 1200. Each FIG. 12 radial truss 1200 length is oriented horizontally. The FIG. 12 radial truss depth is oriented vertically with a top chord 1202 and a bottom chord 1204. The vertical distance between the top chord 1202 and the bottom chord 1204 is 0.1167D, exactly matching and varying with the FIG. 11 ring truss 1100 depth. The full lengths of the top chord 1202 and the bottom chord 1204 are connected with a continuous series of diagonal lacings 1206. At two locations the top chord 1202 and bottom chord 1204 are connected by vertical struts 1212. At one of these locations, point 1502, the FIG. 12 radial truss 1200 supports the outer rail 1004. At the other location the FIG. 12 radial truss 1200 supports one end of each of two FIG. 14 rail trusses 1400. The total length of the FIG. 12 radial truss 1200 is 1.655D, but may vary from 1.5D to 2.5D. The inner end 1208 of each FIG. 12 radial truss 1200 is connected to one vertex of the FIG. 11 ring truss 1100. There are six FIG. 12 radial trusses 1200 connected to each FIG. 11 ring truss 1100 in this embodiment. The number of FIG. 12 radial trusses 1200 will vary to match the number of FIG. 9 peripheral towers 900. The outer end 1210 of each FIG. 12 radial truss 1200 is connected to the inside leg 902 of the FIG. 9 peripheral tower 900 at that location.

Figure 13:
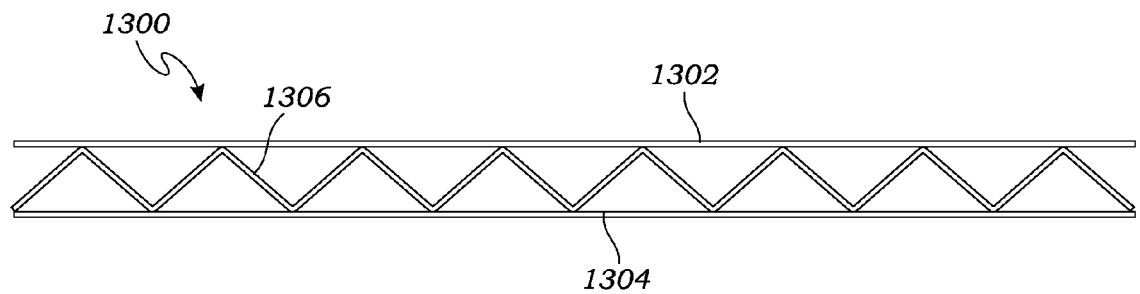
FIG. 13 is an elevation view of a peripheral truss.

FIG. 13 is an elevation view of the first embodiment of the peripheral truss 1300. Adjacent FIG. 9 peripheral towers 900 may be connected via the peripheral trusses 1300. Each FIG. 13 peripheral truss 1300 length is oriented horizontally. Each FIG. 13 peripheral truss 1300 depth is oriented vertically with a top chord 1302 and a bottom chord 1304. The vertical distance between the top chord 1302 and the bottom chord 1304 is 0.1167D, exactly matching and varying with the FIG. 12 radial truss 1200 depth. The full lengths of the top chord 1302 and the bottom chord 1304 are connected with a continuous series of diagonal lacings 1306. The total length of the FIG. 13 peripheral truss 1300 is 1.9124D, but may vary from 1.5D to 2.5D or as needed to connect between adjacent FIG. 9 peripheral towers 900. Each end of the FIG. 13 peripheral truss 1300 is connected to the inside leg of a FIG. 9 peripheral tower 900 and the FIG. 12 radial truss 1200 at that location.

Figure 14:
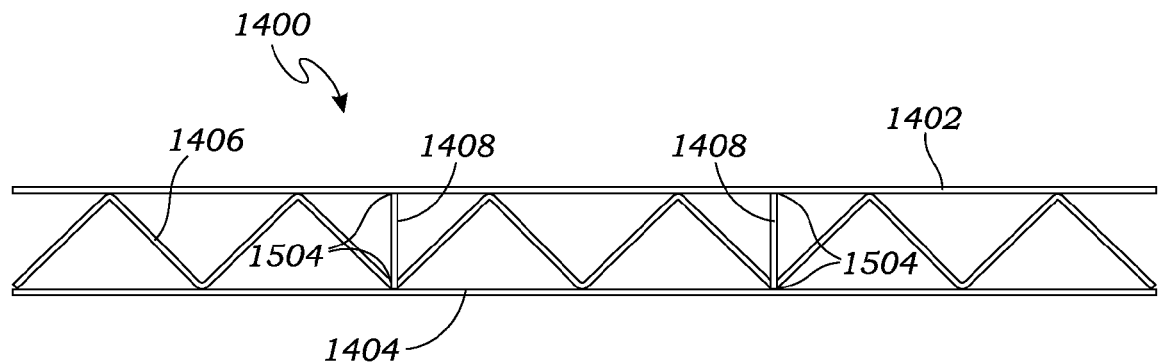
FIG. 14 is an elevation view of a rail truss.

FIG. 14 is an elevation view of the first embodiment of the rail truss 1400. Each FIG. 14 rail truss 1400 is oriented horizontally. The FIG. 14 rail truss 1400 depth is oriented vertically with a top chord 1402 and a bottom chord 1404. The vertical distance between the top chord 1402 and the bottom chord 1404 is 0.1167D, exactly matching and varying with the FIG. 12 radial truss 1200 depth. The full lengths of the top chord 1402 and the bottom chord 1404 are connected with a continuous series of diagonal lacings 1406. At two locations the top chord 1402 and the bottom chord 1404 are connected by vertical struts 1408. These two locations, points 1504, correspond to the locations where the outer rails 1004 are supported by the FIG. 14 rail truss 1400. The total length of the FIG. 14 rail truss 1400 is 1.2474D, but may vary from 1.0D to 2.0D or as needed to span between adjacent FIG. 12 radial trusses 1200 and support up to two outer rails 1004 at two locations. Each end of the FIG. 14 rail truss 1400 is connected to a FIG. 12 radial truss 1200.

Figure 15:
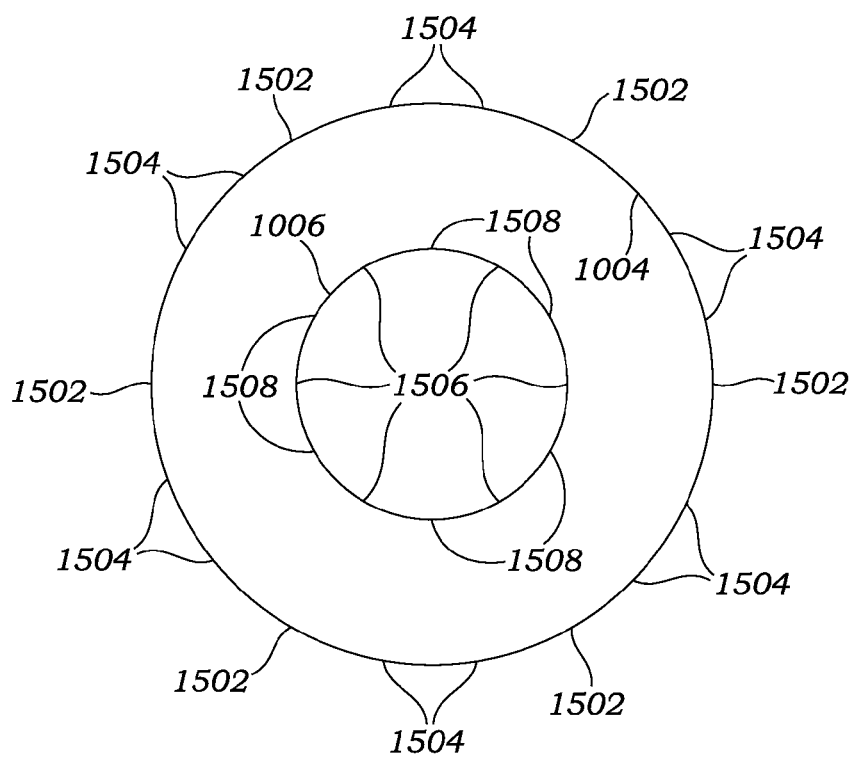
FIG. 15 is a plan view of rails.

FIG. 15 shows a plan view of the first embodiment of outer rails 1004 and inner rails 1006. The outer rail 1004 has a radius of 1.097D, which may vary from 0.75D to 1.5D. The outer rail 1004 is attached at points 1502 to the six FIG. 12 radial trusses 1200 at sixty-degree intervals in this embodiment. The outer rail 1004 is attached at points 1504 in two places to each of the six FIG. 14 rail trusses 1400 between the FIG. 12 radial trusses 1200. The locations of the attachments 1504 to the FIG. 14 rail trusses 1400 are spaced so the rail 1004 is attached at regular twenty-degree intervals throughout its full circumference. The number of rail 1004 attachments 1502 and 1504 and their angular intervals will vary with the number of FIG. 12 radial trusses 1200.

The inner rail 1006 has a radius of approximately 0.255D, which may vary from 0.5D to 1.5D. The inner rail 1006 is attached at points 1506 to the six FIG. 12 radial trusses 1200 at sixty-degree intervals for this embodiment. The inner rail 1006 is supported to resist horizontal loads by braces 1008 at points 1508 halfway between the FIG. 12 radial trusses 1200. Braces 1008 are positioned as shown in FIG. 10 between rails 1006 and FIG. 11 ring trusses 1100. The number of rail 1006 attachments 1506 and their angular intervals will vary with the number of FIG. 12 radial trusses 1200.

Figure 16:
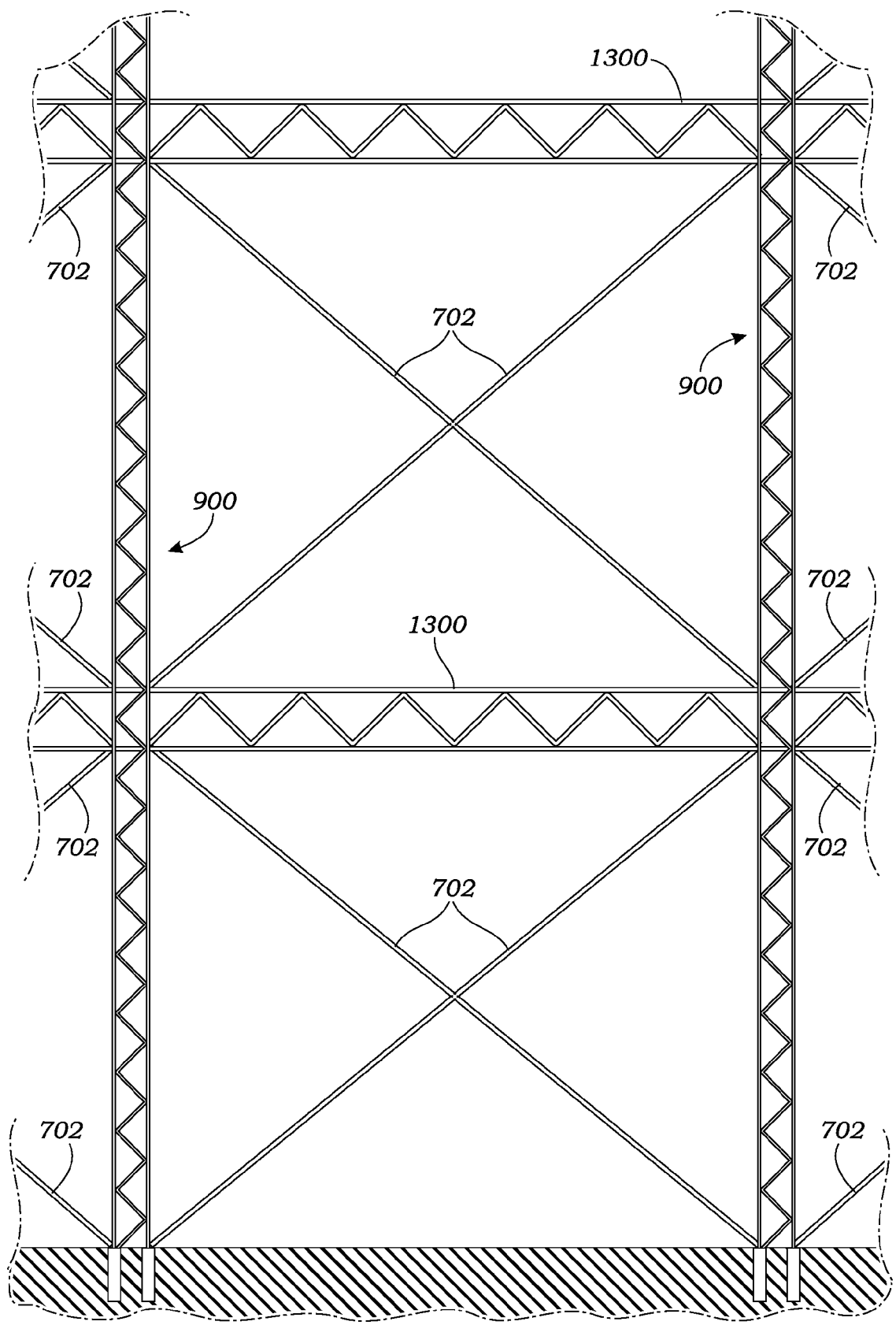
FIG. 16 is an elevation view of guy pairs.

FIG. 16 is a partial elevation view drawing of the outside face of the FIG. 7 support structure 102. FIG. 16 shows the configuration of pairs of guys 702. Guys 702 connect diagonally between adjacent FIG. 9 peripheral towers 900 and between adjacent FIG. 13 peripheral truss 1300 levels. However, the bottom pair of guys 702 connect between the bottom FIG. 13 peripheral truss 1300 and the base of the two adjacent FIG. 9 peripheral towers 900. Guys 702 provide structural stability to the FIG. 7 support structure 102.

Operation of the Facility to Generate Electrical Power

Each FIG. 4 module 500 is continually oriented to face directly into the prevailing wind. The wind entering the front 308 of each FIG. 3A shroud 300 has its velocity increased by approximately 50 percent at the throat 312 by the carefully selected aerodynamic shape of the outer front curve 330 and the inner front curve 336. This increased wind velocity then drives the turbine 204 located at the throat 312 and the related FIG. 2 power system 200 to produce electric energy for human use. Both the FIG. 3A shroud 300 shape and the FIG. 2 power system 200 are selected and optimized to increase the power production as much as practical.

The wind passing over the FIG. 3A shroud 300 produces drag forces. The total aerodynamic shape of the FIG. 3A shroud 300 is optimized to the extent feasible to reduce these drag forces. This is significant because all structural components of the support structure 102 must provide the strength to resist drag forces as well as support the weight of the modules 500. The cost of this structural strength affects the commercial feasibility of the present invention.

Method of Erecting the Facility

The present invention also includes a method for erecting a facility 100 such as the facility 100 described above. This erection comprises a series of steps which will be discussed in chronological order below, and further illustrated by FIGS. 17-37.

Figure 17:
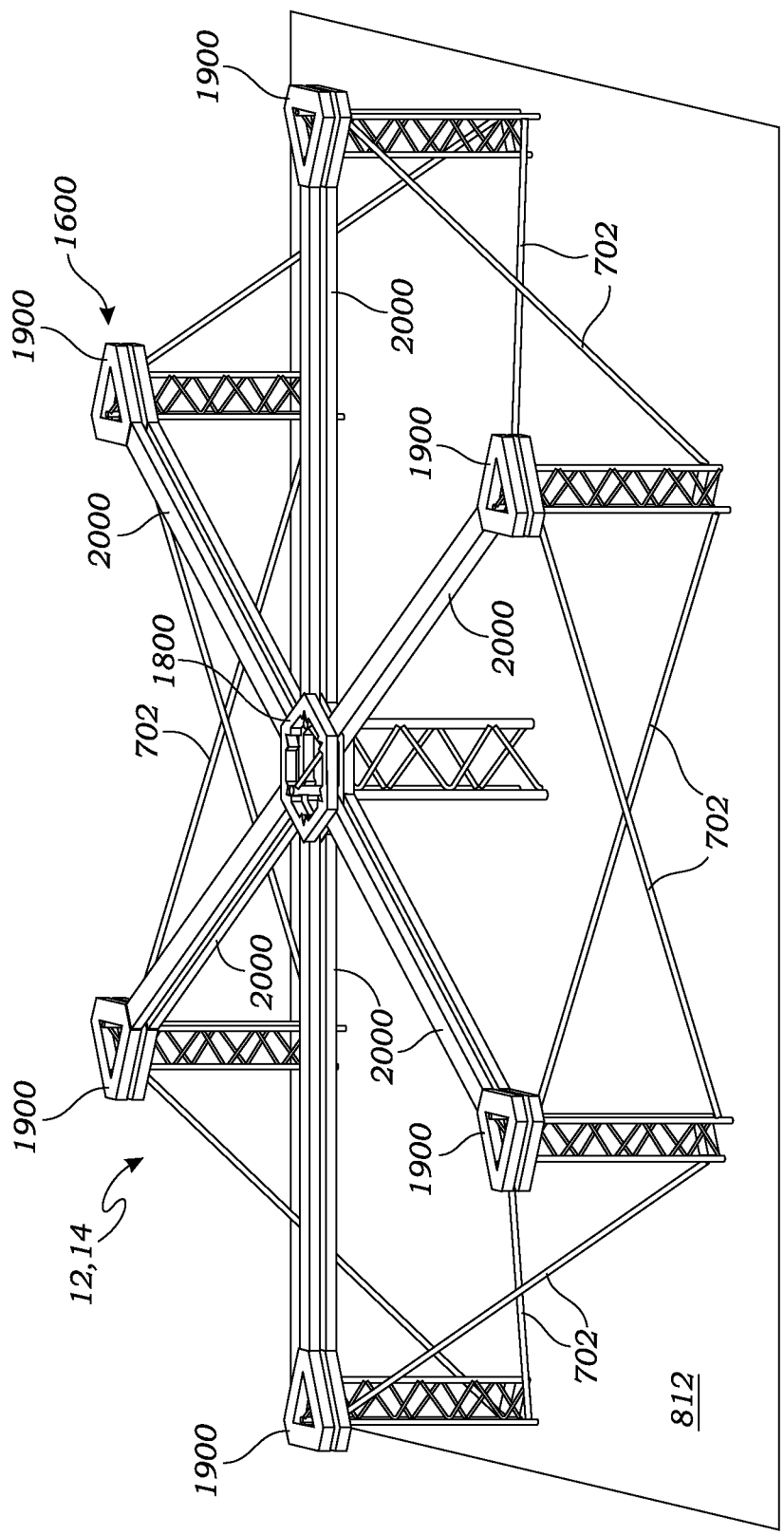
FIG. 17 is a perspective view of a base of the facility early in construction, illustrating a core tower, peripheral towers, guys, and work areas.

FIG. 17 is a perspective view of a base portion of the facility 100 shortly after the start of erection. As illustrated in FIG. 17, the method first includes constructing a foundation 812 to support the facility 100 as well as erecting towers 12 on the foundation 812. Towers 12 is comprised of at least 3 (although potentially more) peripheral towers 900, and may further include a core tower 800. Constructing the foundation 812 may include various steps, such as clearing and grading the site, as well as constructing any form of suitable foundation elements for supporting the facility, such as described below. In one embodiment, the foundation may be a single concrete structure, or multiple structures, such as are well known in the art. In another embodiment, piers may be driven into the ground, or any number of structures known in the art may be used for constructing the facility over water. Any form of supporting the facility known to those skilled in the art should be considered within the scope of the present invention.

Tower panels 14 are erected on the foundation 812 to begin erecting the towers 12. Tower panels 14 are comprised of at least 3 peripheral tower panels 908 and one core tower panel 808, all spanning the same vertical portion of tower 12. The tower panels 14 may be erected as previously illustrated in FIGS. 8 and 9; however, these tower panels 14 may vary in erection according to alternative embodiments designed by one skilled in the art. For purposes of this application, the term "panel" shall be broadly construed to include any form of structural element that is, when connected in series, forms one of the towers 900 and/or 800. The precise construction of each panel 14 may vary according to the design of one skilled in the art, and alternative shapes and structures should be considered within the scope of one skilled in the art.

The towers 12 are disposed in a manner that is structurally stable. If three peripheral towers 900 are utilized, for example, they might be disposed in the shape of an equilateral triangle, although modified shapes are also possible to the extent that they remain structurally sound. If alternative numbers of peripheral towers 900 are utilized, further alternative shapes and dispositions may be utilized.

Figure 21:
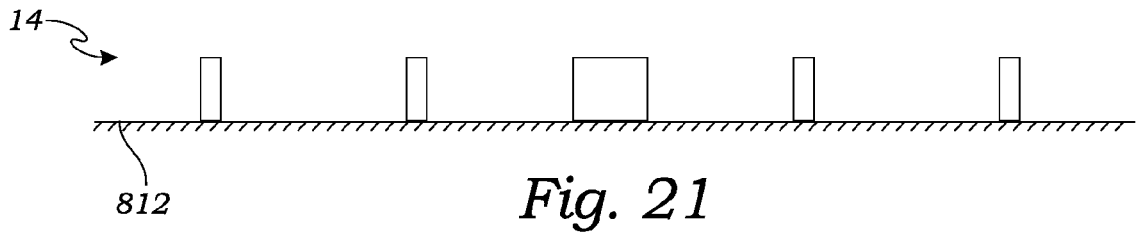
FIG. 21 is a front view of the initial tower panels on the foundation.

In the embodiment illustrated in FIG. 17, the towers 12 include a core tower 800 and six peripheral towers 900, although the number of the peripheral towers 900 may vary. In the start of tower erection in this embodiment, therefore, initial tower panels 14 are installed on the foundation 812 comprised of six peripheral tower panels 908 disposed around the core tower panel 808. This step of erecting the initial panels 14 is illustrated in FIG. 21, and discussed in greater detail below.

The method further involves connecting and tensioning guys 702 between the two temporary guy devices 1914 in each of the peripheral work platforms 1900 and the two adjacent peripheral towers 900, as illustrated in FIG. 17. As illustrated in FIG. 17, multiple guys 702 are installed between the temporary guy devices 1914 and towers 900. These guys 702 may provide lateral and torsional stability to the facility 100 and may be adjusted as needed. Throughout the erection process, the specific connection points of the guys 702 may be adjusted, and additional guys 702 may also be added to the peripheral towers 900 to maintain the structural integrity of the facility 100. In the preferred embodiment of the present invention, for example, guys 702 may be permanently installed as needed, and other guys 702 may be temporarily attached, extended, and periodically released and moved upwards at intervals, in order to provide continuous support to the erection of additional peripheral tower panels 908, until they are replaced with permanent guys 702.

As illustrated in FIG. 17, work areas 1600 may also be provided at and between the core tower 800 and peripheral towers 900. These work areas 1600 may provide safe workspace and walkways during the erection process, providing a safe location for erection workers to work on the components of the facility 100. In the embodiment of FIG. 17, the work areas 1600 include a central work platform 1800 around the core tower 800, peripheral work platforms 1900 that each extend around one of the peripheral towers 900 and work trusses and walkways 2000. The central work platform 1800 is connected with each of the peripheral work platforms 1900 via the work truss and walkway 2000, which together provide temporary lateral structural support to the towers 800 and 900, as well as work areas and walkways for workers to move between the central work platform 1800 and all of the peripheral work platforms 1900. These elements are illustrated in greater detail in FIGS. 18-20, and are discussed in greater detail below.

Figure 18:
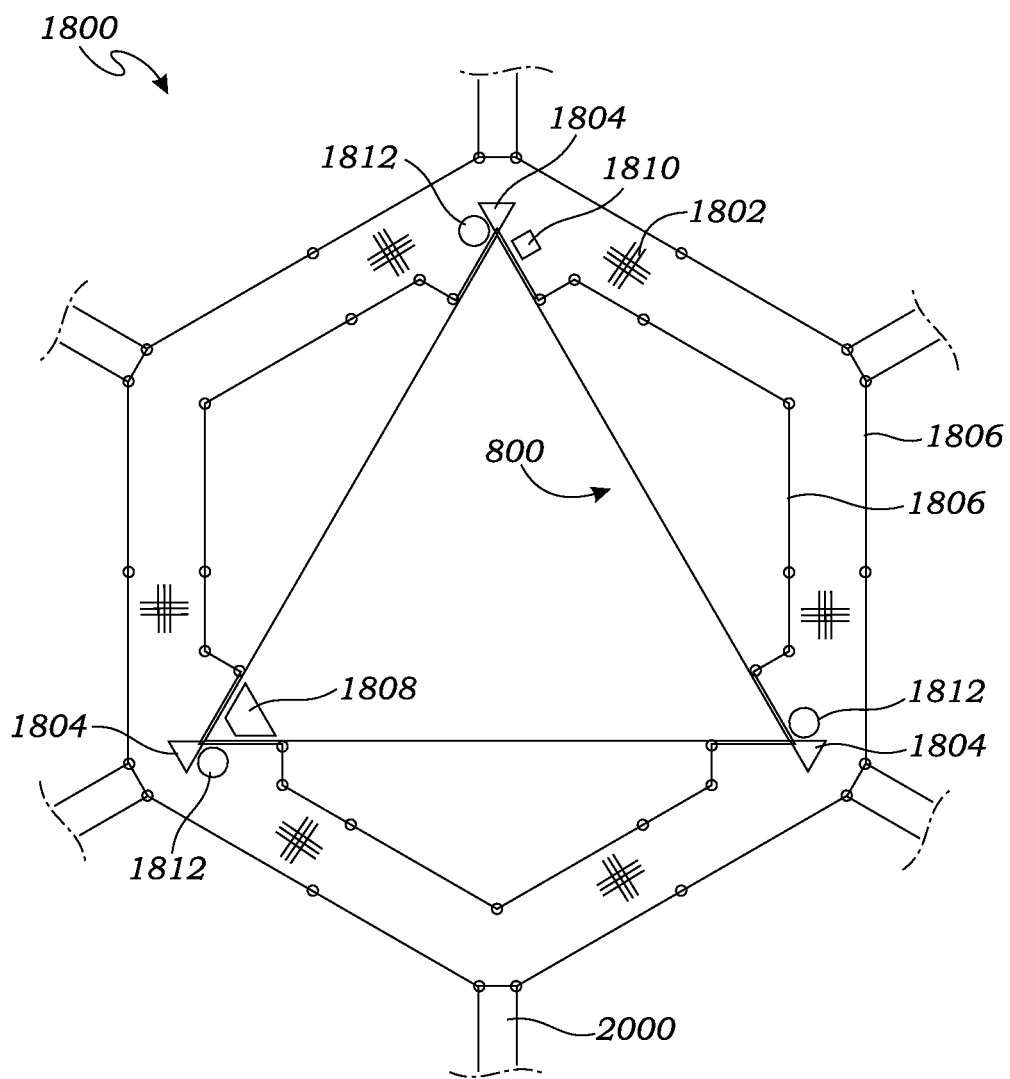
FIG. 18 is a plan view of a central work platform.

FIG. 18 is a plan view of the central work platform 1800. As described above, the central work platform 1800 provides erection workers with a safe, grated workspace 1802 and a means to work around the core tower 800. According to the embodiment illustrated by FIG. 18, the central work platform 1800 is hexagonal in shape (although other shapes may be used) and surrounds the core tower 800. The central work platform 1800 abuts the three corner areas of the triangular core tower 800, thus allowing erection workers to access the core tower 800 directly from the central work platform 1800. The central work platform 1800 may also be equipped with guard rails 1806, climbing mechanisms 1804 which engage each tower leg 802 for raising the central work platform 1800, a plurality of hoists 1812 for lifting the truss and rail system 1000 (illustrated in FIG. 10), as discussed above, a personnel elevator 1808 (for transporting workers to and from the ground of the facility), and a crane 1810 for lifting and positioning subsequent components of the adjacent support structure 102. While FIG. 18 illustrates one embodiment of the central work platform 1800, alternative embodiments may also be utilized by one skilled in the field.

Figure 19:
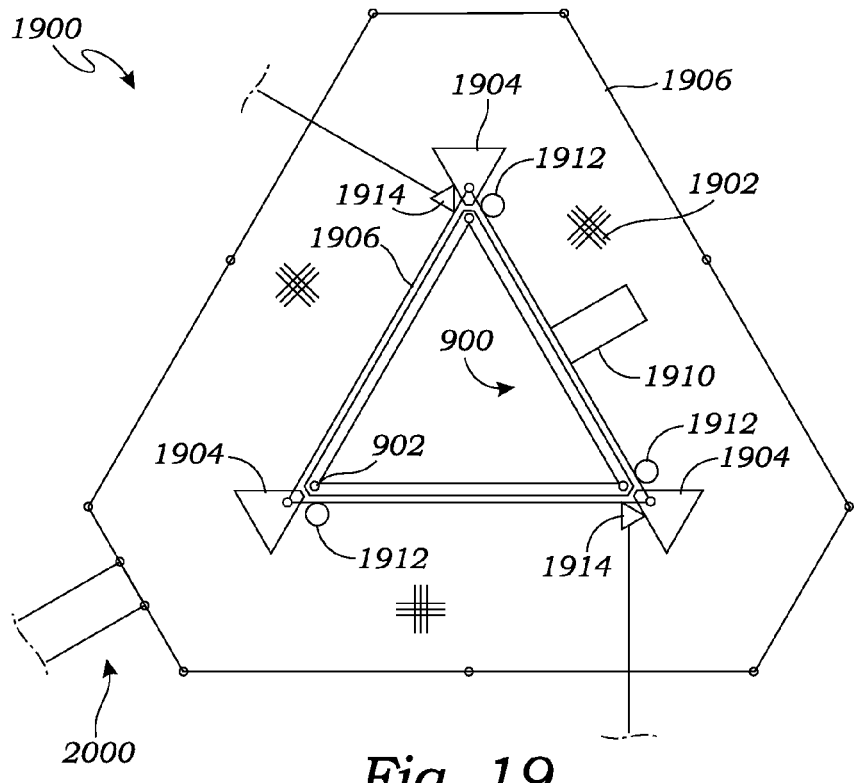
FIG. 19 is a top plan view of a peripheral work platform.

FIG. 19 is a plan view of the peripheral work platform 1900. The peripheral work platform 1900, much like the central work platform 1800, provides a safe workspace 1902 for erection workers, as well as a means to access peripheral towers 900 from a safe location. As illustrated in FIG. 19, the peripheral work platform 1900 of this embodiment is triangular in shape (although other shapes may be used) and surrounds the peripheral tower 900. The peripheral work platform 1900 may be equipped with hoists 1912, and two temporary guy devices 1914 capable of deploying guys 702 while maintaining pre-determined tensioning and capable of locking deployment should the applied tension exceed specified limits. Furthermore, the peripheral work platform 1900 may also include guard rails 1906, climbing mechanisms 1904 which engage with each tower leg 902, and a crane 1910 for lifting and positioning subsequent components of the adjacent support structure 102. However, the form of the peripheral work platform 1900 may vary according to the design of one skilled in the art; therefore, alternative embodiments are considered within the scope of the present invention.

The climbing mechanisms 1804 and 1904 of FIGS. 18 and 19 and temporary guy devices 1914 of FIG. 19 are operatively controlled so that the work platforms 1800 and 1900 climb their respective towers simultaneously, so that the entire work areas 1600 moves as a unit. Those skilled in the art may devise various mechanisms for achieving this synchronization, and such mechanisms should be considered within the scope of the present invention.

Figure 20:
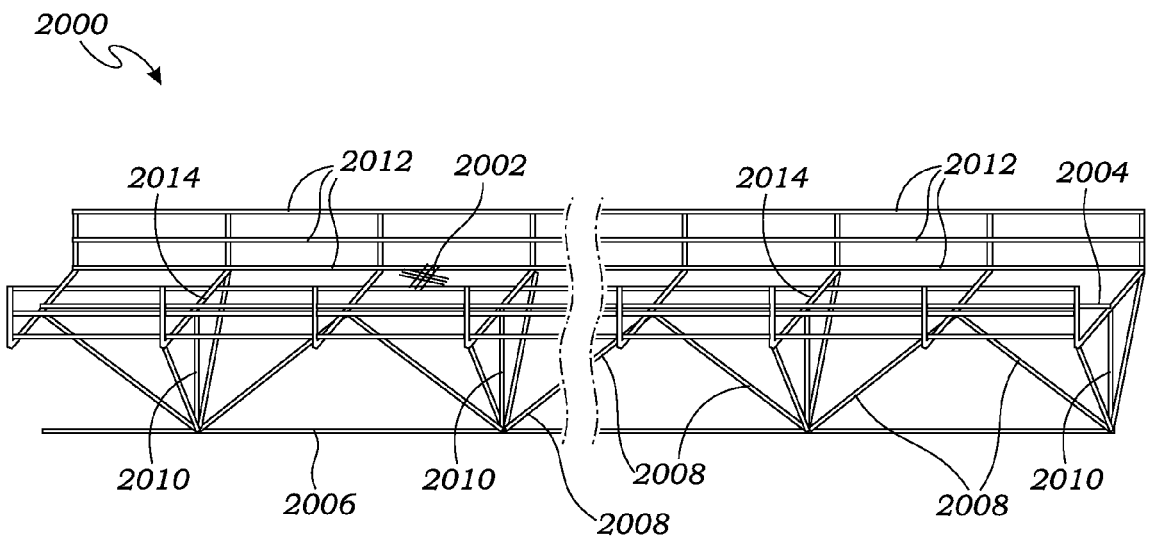
FIG. 20 is a perspective view of a work truss and walkway.

FIG. 20 is a detail of the work truss and walkway 2000. The work trusses and walkways 2000 may function as safe elevated walkways between the central work platform 1800 and each of the peripheral work platforms 1900, and they also provide structural stability to the facility 100 during construction. The work truss and walkway 2000 of this embodiment may include a grated walkway 2002, a top chord 2004, a bottom chord 2006, lacings 2008, struts 2010, guardrails 2012, and walkway supports 2014. While one embodiment of the work truss and walkway 2000 is illustrated, those skilled in the art may devise alternative constructions that provide both the necessary structural support and also a safe walkway for workers, and such alternatives should be considered within the scope of the present invention.

Figure 22:
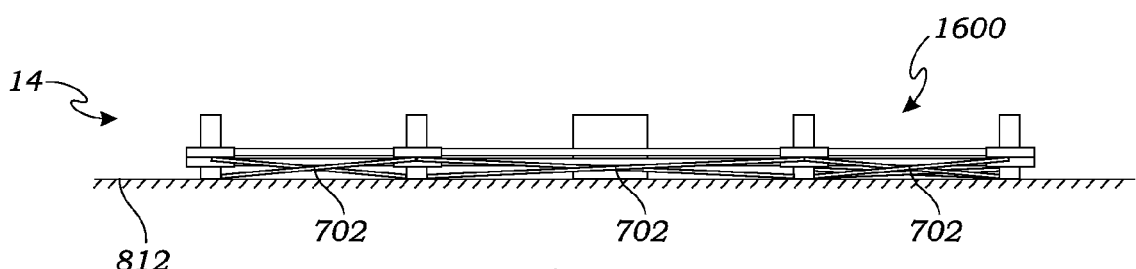
FIG. 22 is a front view of the installed work areas and guys connected between the peripheral towers added to FIG. 21.
Figure 23:
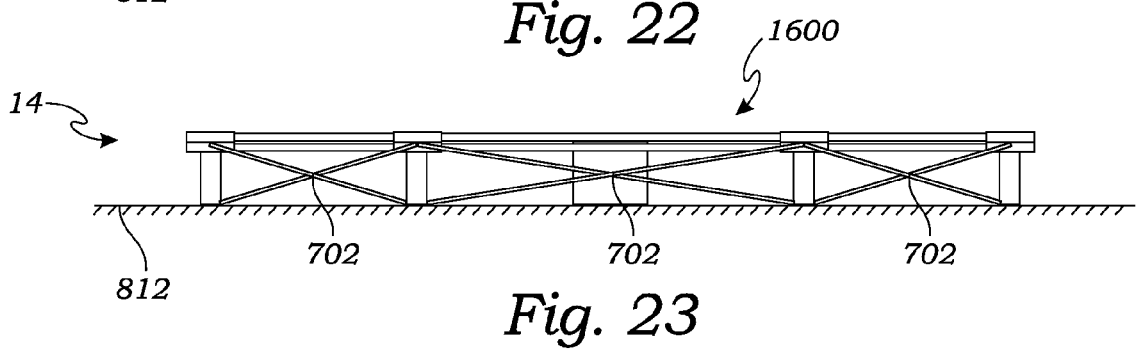
FIG. 23 is a front view of the work areas raised to the top of the tower panels.
Figure 24:
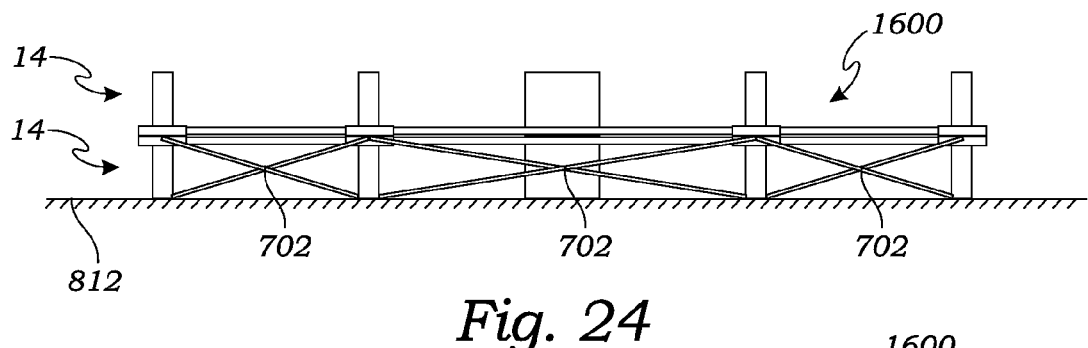
FIG. 24 is a front view of additional tower panels on top of the existing tower panels.
Figure 25:
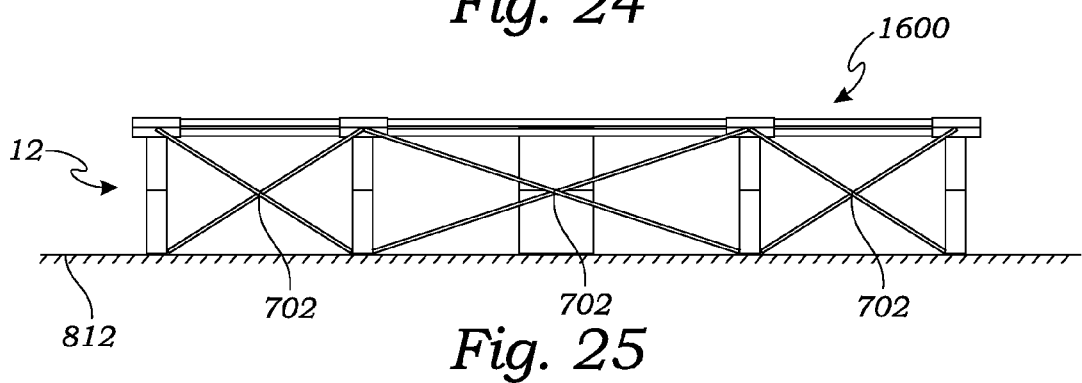
FIG. 25 is a front view of the work areas raised to the top of the additional tower panels.

FIGS. 21-26 are front views of the facility during the early steps of erection, and illustrate the installation of the initial components, adjustment of various elements (such as guys) during installation, and completion of several tower panels 14. As illustrated in FIGS. 21-26, after the foundation 812 has been constructed and the initial tower panels 14 have been erected as shown in FIG. 21, the work areas 1600 may be operably mounted to the bottom of the panels 14 and temporary guys 702 may be connected and tensioned between temporary guy devices 1914 and the bottoms of adjacent peripheral panels 908 as shown in FIG. 22. The work areas 1600 may then be climbed to the tops of the tower panels 14, as demonstrated in FIG. 23. Additional tower panels 14 may then be lifted, positioned, and installed on top of the existing tower panels 14 as illustrated in FIG. 24. Subsequently, the work areas 1600 may be raised further to reach the top of the additional tower panels 14, and the guys 702 may be extended to account for the increased height of the facility 100 as illustrated in FIG. 25. These steps may be repeated until enough panels 14 have been installed to complete the height of a core tower section 15 and the peripheral tower sections 17, which is five panels 14 in this embodiment.

Figure 26:
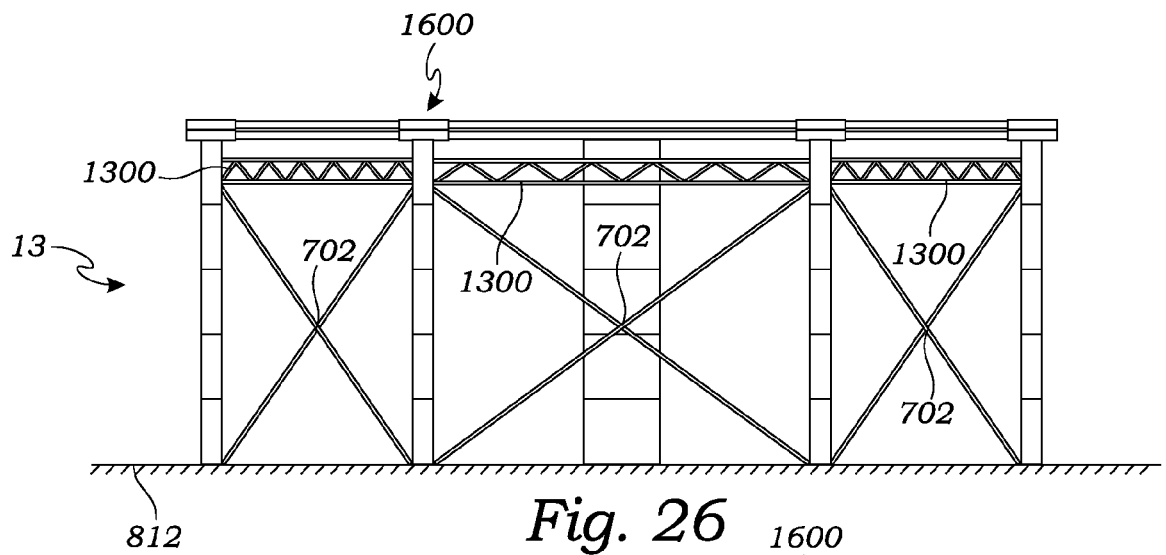
FIG. 26 is a front view of a completed tower section.

Furthermore, when the above five panels 14 are erected, peripheral trusses 1300 may be lifted and installed immediately below the peripheral work platforms 1900 in the middle of the top peripheral tower panel 908 and permanent guys 702 may be installed between adjacent peripheral tower sections 17, as illustrated in FIG. 26 in order to provide stability to the facility 100 as its height increases and to complete the initial tower section 13. A tower section 13 is comprised of one core tower section 15, at least three peripheral tower sections 17, peripheral trusses 1300 installed as described above between adjacent peripheral tower panels 908, and permanent guys 702 installed between adjacent peripheral tower sections 17, all as shown in FIG. 26.

The process of erecting the bottom tower section 13 described above and illustrated in FIGS. 21-26 may be repeated to erect additional tower sections on top of the existing tower sections 13 until a desired height is reached. However, the sequence of erecting additional tower sections 13 must be integrated with the assembly and lifting of truss and rail systems 1000 (which will be supporting modules 500) in order to maintain the structural integrity of the facility 100. It should be noted that although one embodiment of this process is illustrated in FIGS. 21-26, the steps may vary according to the design of one skilled in the art.

FIG. 21 is a front view of the placement of the initial tower panels 14 to form the start of the towers 12 on the foundation 812.

FIG. 22 is a front view of the work areas 1600 (of FIG. 17) once they have been operatively installed, and temporary guys 702 connected between the temporary guy devices 1914 and peripheral tower panels 908.

FIG. 23 is a front view of the work areas 1600 raised to the top of the tower panels 14. In this position, workers on the work areas 1600 are able to raise up and install the next panels 14. This is illustrated in FIG. 24, which is a front elevation view of the support structure 102 with additional tower panels 14 raised up and installed on top of the existing tower panels 14. FIG. 25 is a front elevation view of the work areas 1600 raised to the top of the towers 12, where erection may continue.

FIG. 26 is a front view of the work areas 1600 raised to the top of additional tower panels 14, once five panels 14 have been constructed in the manner described above. FIG. 26 also illustrates how peripheral trusses 1300 have been added, and guys 702 have been permanently installed between adjacent peripheral towers 900 to complete the first tower section 13 of the towers 12.

Figure 27:
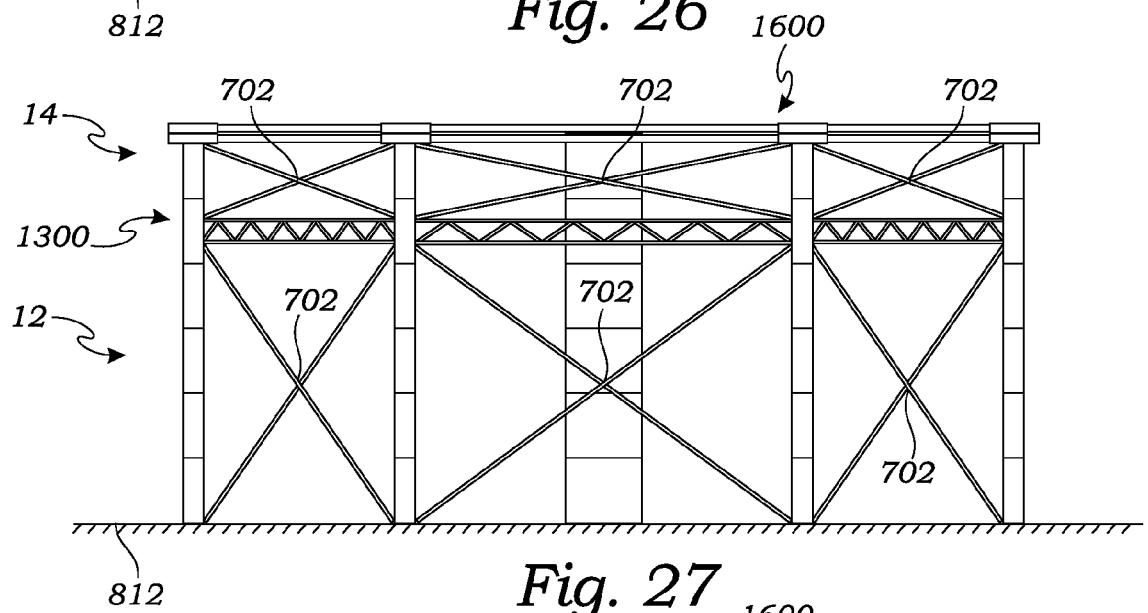
FIG. 27 is a front view of the work areas raised to the top of additional tower panels.
Figure 28:
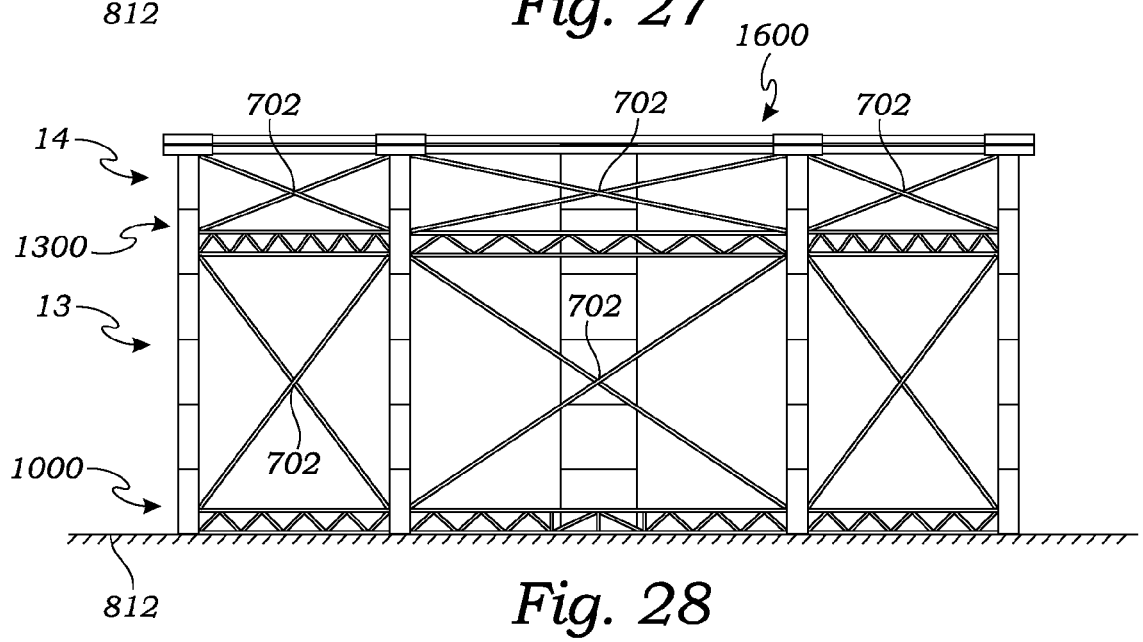
FIG. 28 is a front view of FIG. 27 with a truss and rail system constructed at the base.
Figure 29:
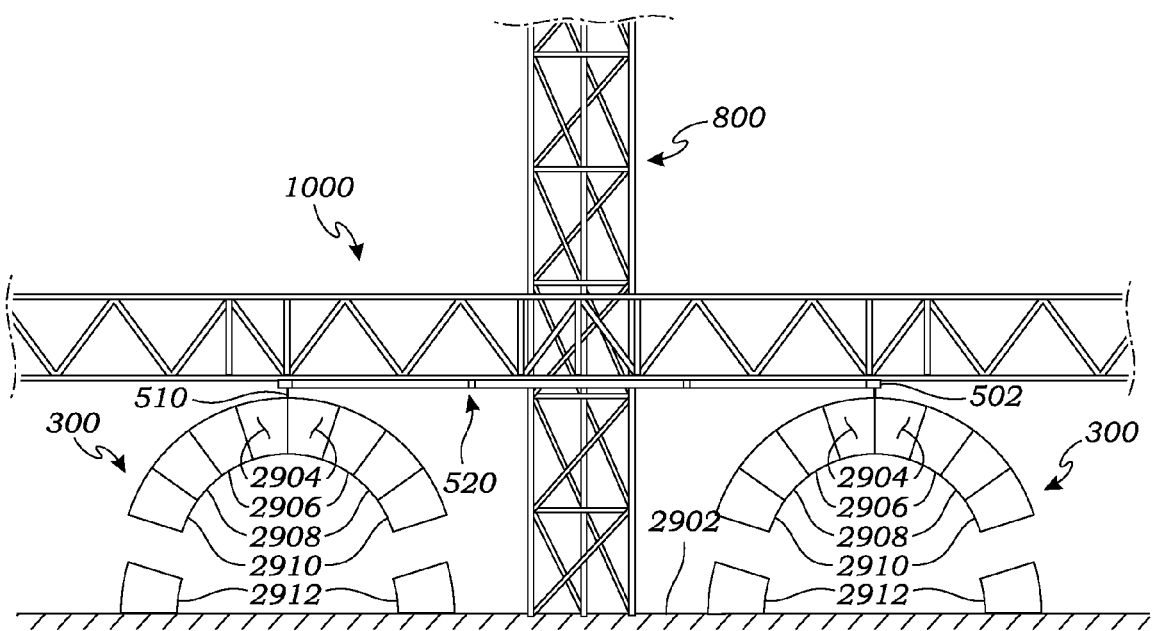
FIG. 29 is a front view of a pair of shrouds being constructed from shroud sectors and being mounted to a frame.

FIGS. 27-29 and 31 are views of the developing facility 100, which show the beginning of the second tower section 13 and completion of the first lifting unit 3100. A lifting unit 3100 is comprised of a truss and rail system 1000 supporting a completed module 500. To begin the next tower section 13, additional tower panels 14 are installed on the existing towers 12 and temporary guys 702 are connected and tensioned as before between temporary guy devices 1914 and adjacent peripheral tower panels 908 as illustrated in FIG. 27. FIG. 28 illustrates a truss and rail system 1000, which may be installed to the base of the towers 12 to serve as structural support for the module 500 that is to be mounted later and to contribute to the structural stability of the facility 100. This truss and rail system 1000 may be raised incrementally in the bottom tower section 13 to accommodate the assembly of module 500 as shown in FIG. 29.

New temporary guys 702 are added, as illustrated in FIG. 27, which is a front view of the work areas 1600 raised to the top of an additional tower panel 14.

FIG. 28 illustrates the construction of the first truss and rail system 1000 at the base of the facility 100. As illustrated in FIG. 28, the truss and rail system 1000 may be assembled and installed on the ground by workers working beneath portions of the facility 100 above. This method helps protect these workers from potential injuries that may be inflicted during work high up in the facility. This also reduces construction costs, because specialty workers are not required.

Figure 30:
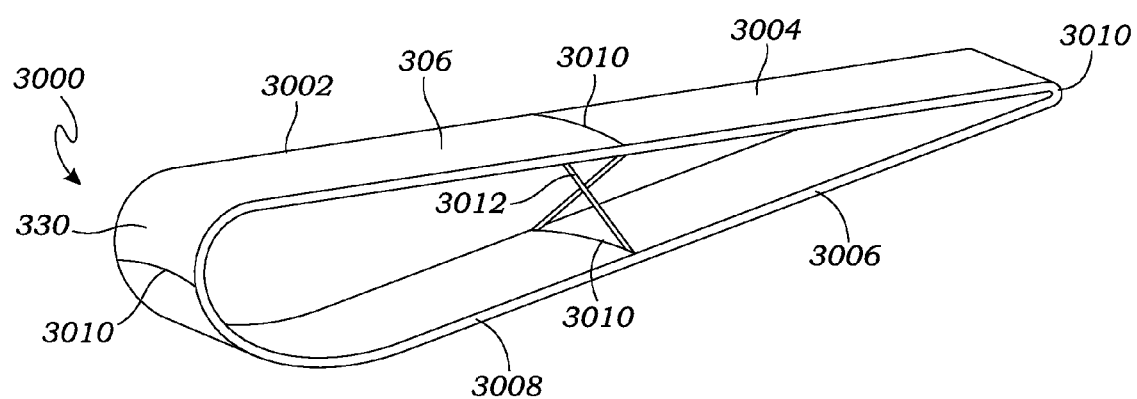
FIG. 30 is a perspective view of one of the shroud sectors.

FIG. 29 is a partial front view of the assembly of a pair of shrouds 300 (described above) from shroud sectors 3000 and their being mounted to an upper frame 520. FIG. 30 is a perspective view of one of the shroud sectors 3000.

As best illustrated in FIG. 29, the truss and rail system 1000 is raised above the work area 2902 a short distanced to allow components of the module 500 to be attached below. The upper frame 520 may then be mounted on the truss and rail system 1000 via the plurality of trucks 510 and 516 and raised to accommodate the assembly of a pair of shrouds 300. FIG. 29 depicts the mounting and assembling of shroud sectors 3000 onto the upper frame 520 to form the pair of shrouds 300 beneath the truss and rail system 1000. In this embodiment, assembling the pair of shrouds 300 includes a work area 2902, an initial pair 2904 of shroud sectors 3000 attached to beams 502 at each end of the upper frame 520, and subsequent shroud sector pairs 2906, 2908, and 2910 attached to each side of the installed center portion of each shroud 300 being assembled. Sector pairs 2912 on the base assembly area 2902 may be placed in position to be lifted and attached to the assembled portion of each shroud 300. The internal supports 350 of the shroud interior structure system 346 may be installed incrementally as shroud sectors 3000 are added and temporary struts 3012 may be removed as they are no longer needed. The process of installing shroud sectors 3000 may continue until completion of the shrouds 300. Then the lower truss 540, trucks 510 and 516 and module guy pairs 402 may be installed for completion of a module 500.

FIG. 30 illustrates a preferred embodiment of the shroud sector 3000, in which the outer surface 306 of the shroud sector 3000 includes an outer front curve 330 that begins at a point going away from and perpendicular to an axis previously described herein. The shroud sector 3000 may include an outside front panel 3002, an outside rear panel 3004, an inside rear panel 3006, an inside front panel 3008, transverse joints 3010 between panels at the front 308 and rear 310, and temporary struts 3012 at middle transverse joints 3010. A FIG. 30 shroud sector 3000 may have any number of pairs of inner and outer panels 3006 and 3004 with associated transverse joints 3010 and temporary struts 3012. Furthermore, to construct the shroud 300, each shroud sector 3000 may be operably attached on each side to an adjacent shroud sector 3000 in order to form a hollow toroid. It should be noted that while FIGS. 29-30 illustrate one embodiment of the shroud 300 form and construction, one skilled in the art may devise alternative embodiments of the present invention. For example, the shape of each shroud sector 3000 may vary, or the temporary struts 3012 may or may not be present. Nonetheless, various embodiments are considered within the scope of the present invention.

Figure 31:
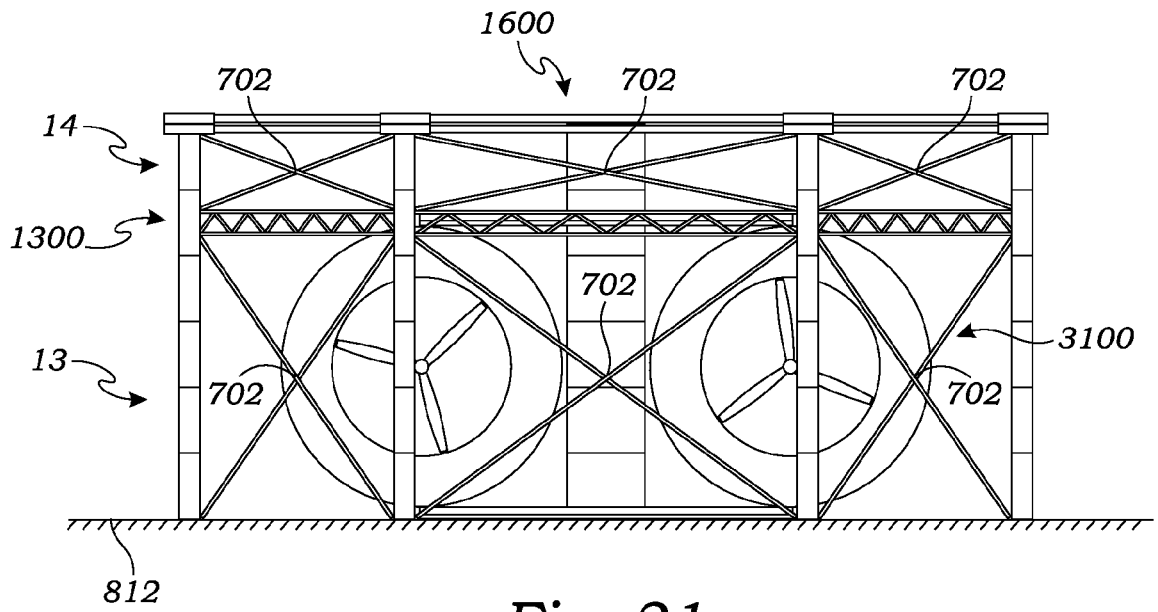
FIG. 31 is a front view of a lifting unit positioned in the bottom tower section.
Figure 32:
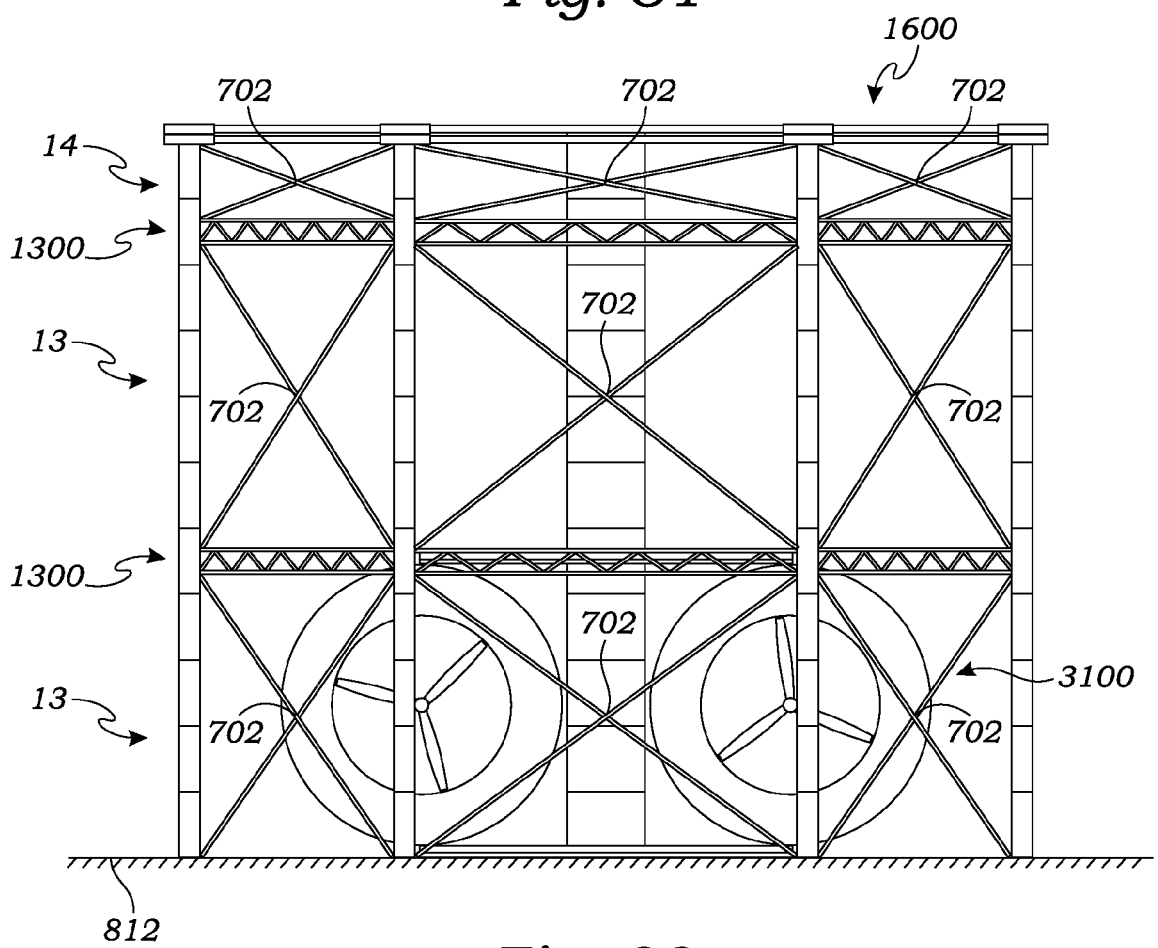
FIG. 32 is a front view of the work platforms raised to the top of an additional tower section, with the lifting unit mounted within the section below.
Figure 33:
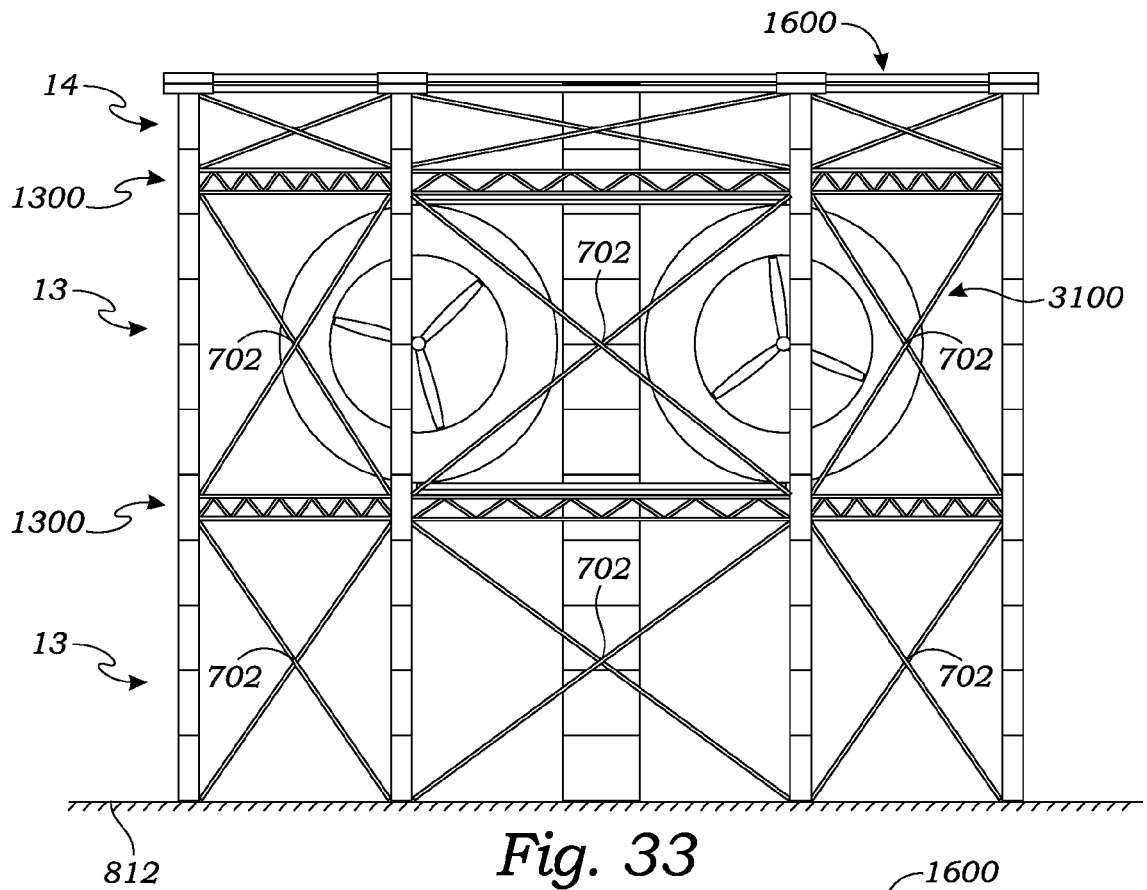
FIG. 33 is a front view of the lifting unit raised to the upper tower section.
Figure 34:
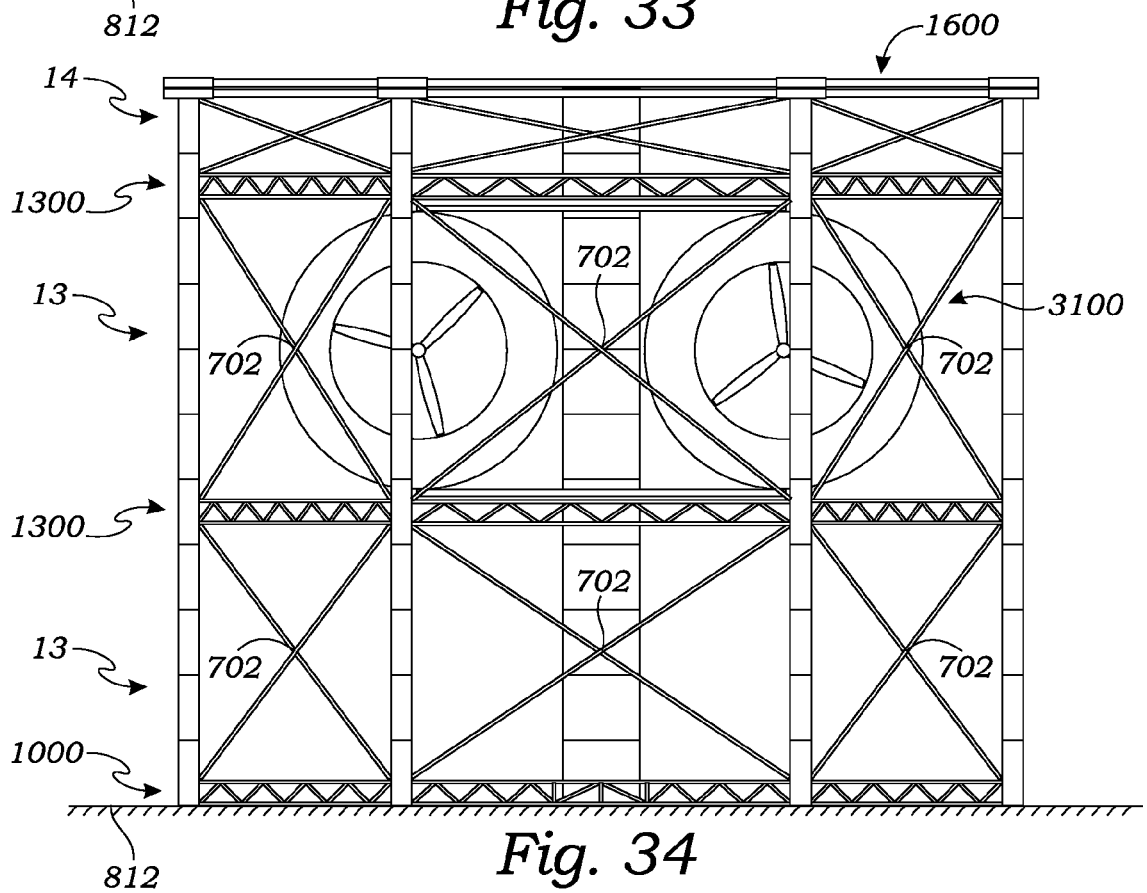
FIG. 34 is a front view of FIG. 33 with a second truss and rail system constructed at the base.
Figure 35:
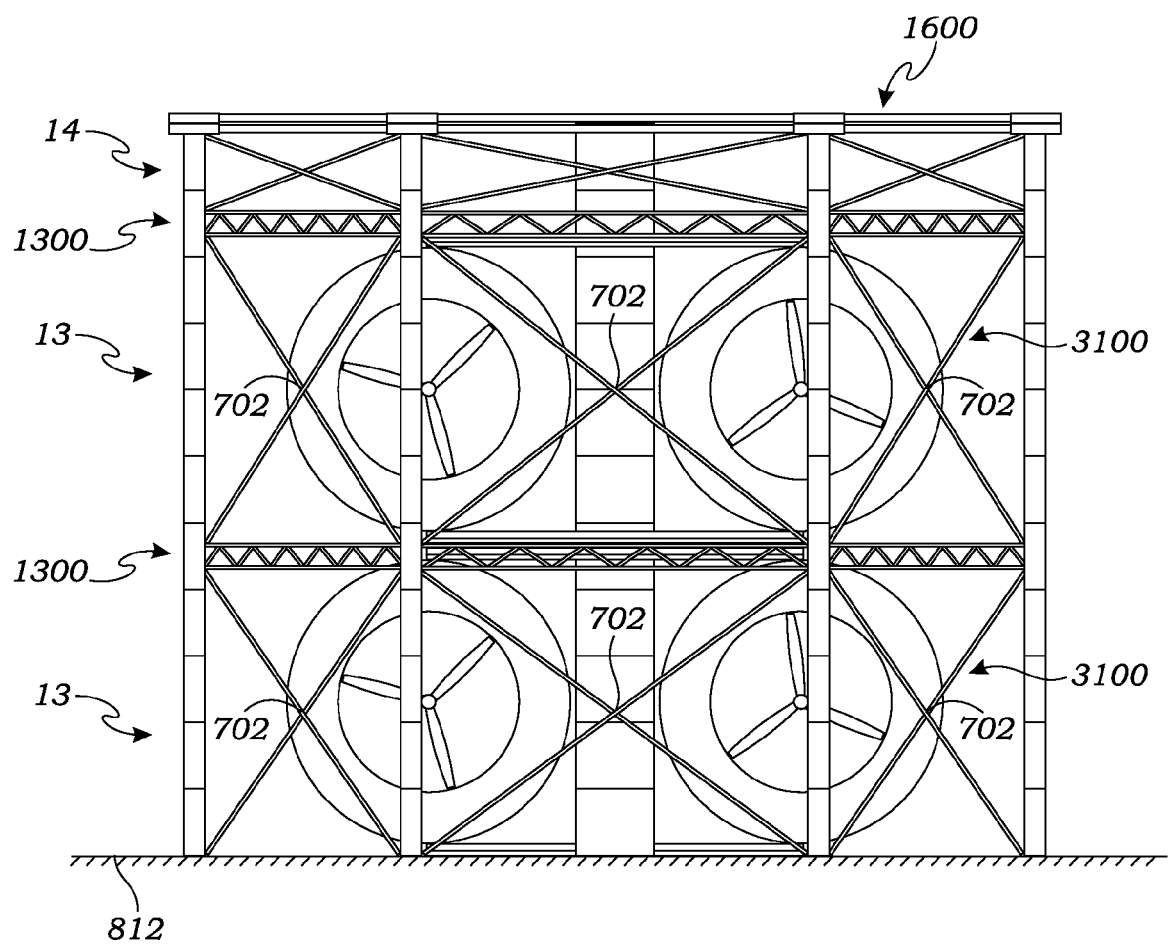
FIG. 35 is a front view of two completed lifting units within the towers.

FIG. 31 is a front view of a lifting unit 3100 positioned in the bottom tower section 13 after completion of the module 500. FIG. 32 is a front view of the work areas 1600 raised to the top of an additional panel 14, on top of a second completed tower section 13, with lifting unit 3100 still positioned in the bottom tower section 13. FIG. 33 is a front view of the lifting unit 3100 lifted to occupy the top tower section 13. FIG. 34 is a front view similar to FIG. 33, but with the second truss and rail system 1000 assembled and attached at the base of the bottom tower section 13. FIG. 35 is a front view similar to FIG. 34, but with the second lifting unit 3100 assembled within the bottom tower section 13.

Figure 36:
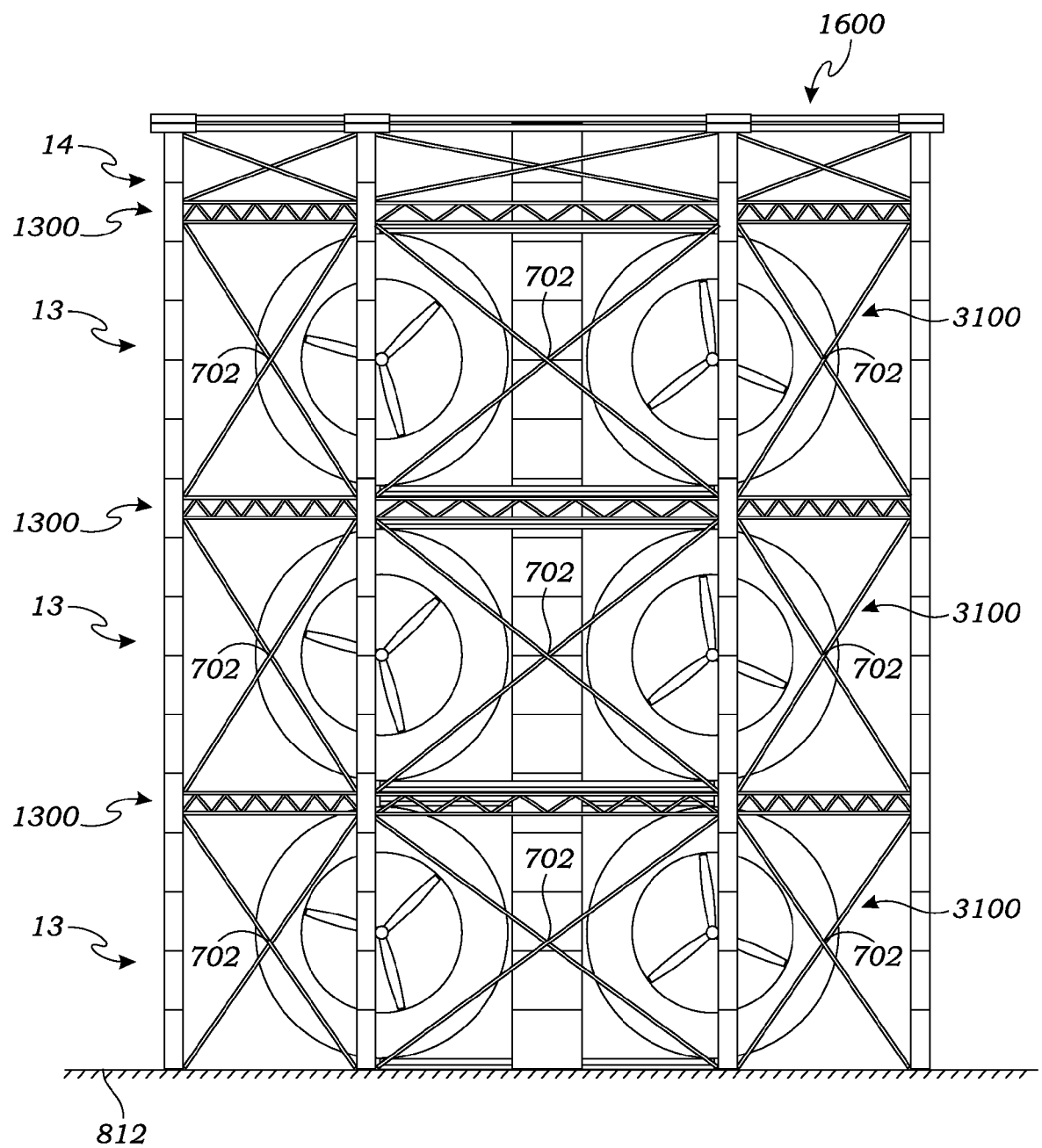
FIG. 36 is a front view of the work platforms raised to the top of an additional tower section, with two lifting units in sections below.
Figure 37:
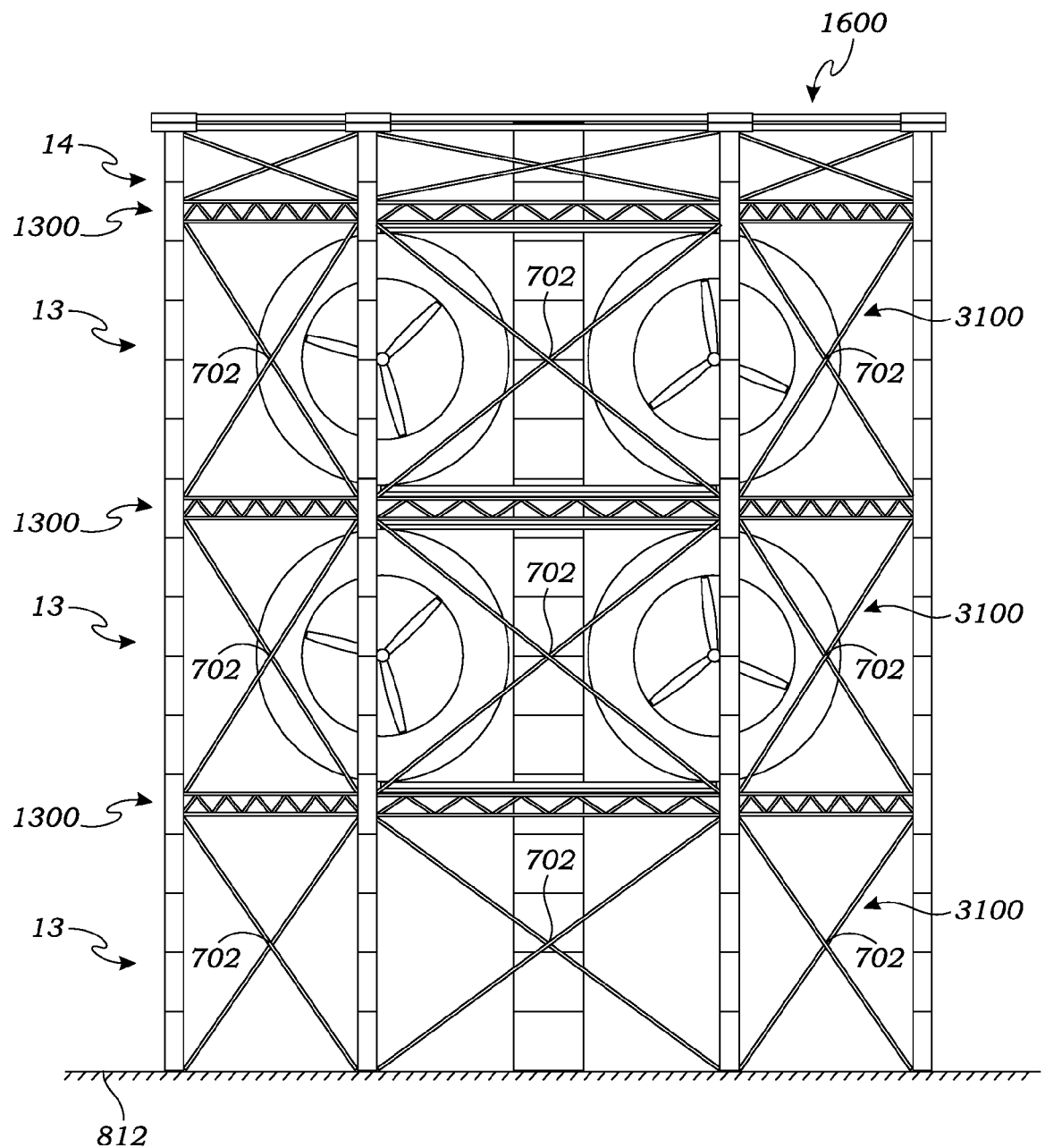
FIG. 37 is a front view of two lifting units raised to the top sections of the towers with the bottom section vacant.

FIG. 36 is a front view of the work areas 1600 raised to the top of an additional tower section 13, with the two lifting units still mounted below in the bottom two tower sections 13. FIG. 37 is a front view with the two lifting units 3100 raised to occupy the upper tower sections 13, leaving the bottom tower section 13 unoccupied.

As illustrated by FIGS. 31-37, the towers 12 erection process involves the installation of additional tower sections 13 on top of existing towers 12, then sequentially raising existing lifting units 3100 to occupy all but the bottom tower section 13. In this manner, beginning at the top lifting unit, the lifting units 3100 may be sequentially lifted and re-mounted to the next higher tower section 13 when the towers 12 are increased in height to accommodate them, as demonstrated in FIGS. 33 and 37. As the last step in this process, each newly constructed lifting unit 3100 in the bottom tower 13 section may be raised to the second tower section 13 above the foundations 812 to leave the bottom tower section 13 vacant. Thus space becomes available at the bottom tower section 13 for assembly of another lifting unit 3100 as needed. As is apparent from FIGS. 31-37, these steps may be repeated several times until a desired number of lifting units 3100 have been mounted on the towers 12 in their permanent locations and the bottom section 13 is not occupied by a module 500.

Lifting units 3100 including modules 500 and truss and rail systems 1000 are permanently mounted when they are positioned in their final location within the facility 100. Then the lower trucks 510 and 516 of each module 500 are operably connected to the upper rails 1004 and 1006 respectively of the truss and rail system below.

During erection, work areas 1600 may be climbed to the top of each tower section 13 in the course of their use. In the preferred embodiment of FIGS. 31-37, this process utilizes rack and pinion elevators 1704 which have been operably mounted to each leg of the towers 12. Each elevator 1704 is powered by a motor driving a pinion gear as a means to hoist all the work areas 1600 simultaneously. The rack and pinion elevators 1704 may be controlled by one operating system and can thus raise all work platforms 1700 and 1800 in a synchronized manner.

While FIGS. 17-37 illustrate one embodiment of the method for erecting a facility 100 for producing electrical energy from wind, the arrangement may vary according to the design of one skilled in the art. As a result, the specific order in which the components of the facility 100 are constructed may be rearranged and/or the components themselves may vary. Nonetheless, these alternative embodiments are considered within the scope of the present invention.

What is claimed is:

1. A method for erecting a facility for producing electrical energy from wind, the method comprising the steps of:
   constructing a foundation to support the facility;
   constructing at least four towers, including one core tower and at least three peripheral towers, on the foundation, the construction comprising the steps of:
   (1) erecting at least four tower panels on the foundation to start the at least four towers;
   (2) operably mounting work platforms at the bases of at least four towers;
   (3) connecting and tensioning temporary guys between each peripheral work platform and the bases of two adjacent tower panels of the at least three peripheral tower panels;
   (4) climbing the work platforms to the top of the at least four towers;
   (5) lifting, positioning, and installing other tower panels on top of the existing at least four towers;
   (6) climbing the work platforms to the top of the at least four towers;
   (7) repeating steps 5-6 until tower panels required for a section of the at least 4 towers are constructed and work areas are positioned at the tops of the at least four towers;
   (8) installing peripheral trusses between adjacent peripheral towers in a top tower panel of the tower section and installing permanent guys between adjacent peripheral towers in that section to complete a section of the at least four towers;
   (9) positioning temporary guys between peripheral work platforms and adjacent peripheral tower panels;
   (10) repeating steps 7-9 until a desired height is reached, and omitting step 9 from the final section; and
   constructing and mounting a plurality of lifting units turbine modules on the at least four towers, the steps of construction beginning after step 9 above and including:
   (11) assembling a truss and rail system at the bottom of the towers;
   (12) mounting the truss and rail system on the towers;
   (13) mounting and assembling shroud sectors on the truss and rail system to form a pair of shrouds;
   (14) periodically lifting and re-mounting the truss and rail system, and thereby lifting the pair of shrouds, when the at least four towers are tall enough to accommodate another pair of shrouds, so that the pair of shrouds are raised to provide space for assembly of another pair of shrouds;
   (15) repeating steps 11-14 until the shrouds have been mounted on the at least four towers; and
   (16) operably mounting each pair of shrouds in its final location on the at least four towers, including connecting each pair of shrouds to a pivotal mounting system both above and below.

2. The method of claim 1, wherein the work platforms are each connected to another of the work platforms by a work truss and walkway that provides structural support to the towers, and also a walkway for enabling workers to move between the work platforms.

3. The method of claim 1, wherein the step of mounting a truss and rail system on the towers includes the steps of mounting the truss and rail system on the towers adjacent the foundation, and then periodically raising the truss and rail system as the shroud sectors are added, so that the construction on the shroud sectors is performed adjacent to the foundation.

4. The method of claim 1, wherein the shrouds are mounted on the pivotal mounting structure via frames.

5. The method of claim 4, wherein the shrouds are mounted on the frames, and the frames are pivotally mounted on the pivotal mounting structure via trucks operably mounted on the annular rail components of the truss and rail systems above and below the upper and lower frames, respectively.

6. A method for erecting a facility for producing electrical energy from wind, the method comprising the steps of:
   constructing a foundation to support the facility;
   constructing a core tower and peripheral towers around the core tower, the construction comprising the steps of:
   (1) erecting a core tower panel and peripheral tower panels around the core tower panel on the foundation to start the core tower and the peripheral towers;
   (2) operably mounting work platforms adjacent to bases of the core tower and the peripheral towers;
   (3) connecting and tensioning temporary guys between each peripheral work platform and the peripheral towers adjacent thereto;
   (4) climbing the work platforms to the tops of the core tower and peripheral towers;
   (5) lifting, positioning, and installing another core tower panel and other peripheral tower panels on top of the existing core tower and peripheral towers;
   (6) climbing all of the work platforms to the tops of the core tower and peripheral towers;
   (7) repeating steps 5-6 until tower panels required for a section of the peripheral towers are constructed and work areas are positioned at the tops of the core tower and peripheral towers;
   (8) installing peripheral trusses between adjacent top peripheral tower panels;
   (9) adjusting and/or adding additional guys;
   (10) repeating steps 7-9 until a desired height is reached; and
   constructing and mounting a plurality of turbine modules on at least four towers, the steps of construction beginning after step 9 above and including:
   (11) assembling a truss and rail system;
   (12) mounting the truss and rail system on the core tower and the peripheral towers;
   (13) mounting and assembling shroud sectors on the truss and rail system to form a pair of shrouds;
   (14) periodically lifting and re-mounting the truss and rail system, and thereby lifting the pair of shrouds, when the core tower and the peripheral towers are tall enough to accommodate another pair of shrouds, so that the pair of shrouds are raised to provide space for assembly of another pair of shrouds; and

(15) repeating steps 1-14 until the shrouds have been mounted on the core tower and the peripheral towers; and
(16) operably mounting each pair of shrouds on a pivotal mounting structure both above and below.

7. The method of claim 6, wherein the work platforms are each connected to another of the work platforms by a work truss and walkway that provides structural support to the core and peripheral towers, and also a walkway for enabling workers to move between the work platforms.

8. The method of claim 6, wherein the step of mounting the truss and rail system on the towers includes the steps of mounting the truss and rail system on the core and peripheral towers adjacent the foundation, and then periodically raising the truss and rail system as the shroud sectors are added, so that the construction on the shroud sections is performed adjacent the foundation.

9. The method of claim 6, wherein the shrouds are mounted on the truss and rail system via a frame.

10. The method of claim 9, wherein the shrouds are mounted on the frame, and the frame is pivotally mounted on the pivotal mounting structure\ via trucks operably mounted on annular rails.

11. A method for erecting a facility for producing electrical energy from wind, the method comprising the steps of:
constructing a foundation to support the facility;
constructing at least three towers on the foundation, the construction comprising the steps of:
(1) erecting at least three tower sections on the foundation to start the at least three towers;
(2) operably mounting work platforms adjacent the tops of the at least three towers;
(3) connecting and tensioning guys between each of the at least three towers and at least one of the adjacent towers;
(4) lifting, positioning, and installing another of the tower sections on top of the existing at least three towers;
(5) climbing all of the work platforms to tops of the at least three towers;
(6) adjusting and/or adding additional guys;
(7) repeating steps 4-6 until a desired height of the at least three towers is reached;
and constructing and mounting a plurality of turbine modules on the at least three towers, the steps of construction including:
(8) assembling a truss and pivotal support system;
(9) mounting the truss and pivotal support system on the towers;
(10) mounting and assembling shroud sectors on the truss and pivotal support system to form a pair of shrouds;
(11) periodically lifting and re-mounting the truss and pivotal support system, and thereby lifting the pair of shrouds, when the at least three towers are tall enough to accommodate another pair of shrouds, so that the pair of shrouds are raised to provide space for assembly of another pair of shrouds; and
(12) repeating steps 8-11 until the shrouds have been operably mounted on the at least three towers.

* * * * *